United States Patent
Lee et al.

(10) Patent No.: US 9,531,468 B2
(45) Date of Patent: Dec. 27, 2016

(54) METHOD AND SYSTEM FOR REQUESTING ALLOCATION OF BANDWITH AND ALLOCATING BANDWITH IN A MULTI-HOP RELAY ENVIRONMENT

(75) Inventors: Ok Seon Lee, Suwon-si (KR); Chan Ho Min, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 569 days.

(21) Appl. No.: 12/991,740

(22) PCT Filed: May 11, 2009

(86) PCT No.: PCT/KR2009/002439
§ 371 (c)(1),
(2), (4) Date: Nov. 9, 2010

(87) PCT Pub. No.: WO2009/139558
PCT Pub. Date: Nov. 19, 2009

(65) Prior Publication Data
US 2011/0058514 A1    Mar. 10, 2011

(30) Foreign Application Priority Data
May 14, 2008    (KR) .................. 10-2008-0044518

(51) Int. Cl.
*H04H 20/71*    (2008.01)
*H04B 7/26*    (2006.01)
(52) U.S. Cl.
CPC .................. *H04B 7/2606* (2013.01)
(58) Field of Classification Search
CPC .................. H04W 84/18–84/22; H04W 52/46
USPC .................................. 370/310–350
See application file for complete search history.

(56) References Cited

U.S. PATENT DOCUMENTS

| | | | | |
|---|---|---|---|---|
| 7,020,822 B2* | 3/2006 | Ho et al. | ......... | 714/748 |
| 8,855,639 B2* | 10/2014 | Youn | ......... | H04W 36/0055 370/331 |
| 2005/0286407 A1* | 12/2005 | Park et al. | ......... | 370/208 |
| 2007/0072604 A1* | 3/2007 | Wang | ......... | 455/428 |
| 2007/0104141 A1* | 5/2007 | Park | ......... | H04W 72/10 370/329 |
| 2007/0153698 A1 | 7/2007 | Lee et al. | | |

(Continued)

FOREIGN PATENT DOCUMENTS

| | | | |
|---|---|---|---|
| KR | 10-2006-0048495 A | | 5/2006 |
| WO | 2007/019672 A1 | | 2/2007 |
| WO | 2008/044317 A1 | | 4/2008 |

*Primary Examiner* — Andrew Chriss
*Assistant Examiner* — Kenan Cehic
(74) *Attorney, Agent, or Firm* — Jefferson IP Law, LLP

(57) ABSTRACT

The present invention relates to a method and a system for requesting the allocation of bandwidth in a multi-hop relay environment. The present invention relates to a method for requesting bandwidth of a relay node in the multi-hop relay environment and a method for allocating bandwidth of a base station. In the invention, single piggybacking and multiple piggybacking based on approval-processing subheaders are discriminated from single piggybacking and multiple piggybacking based on extensible sub-headers. Therefore, the bandwidth-requests for each CID from the base station are integrated and managed for each relay so that the message transmission and reception load may be reduced and the allocation of bandwidth may be optimized.

24 Claims, 16 Drawing Sheets

(56) References Cited

U.S. PATENT DOCUMENTS

2010/0027457 A1\* 2/2010 Okuda .......................... 370/315

\* cited by examiner

FIG. 4
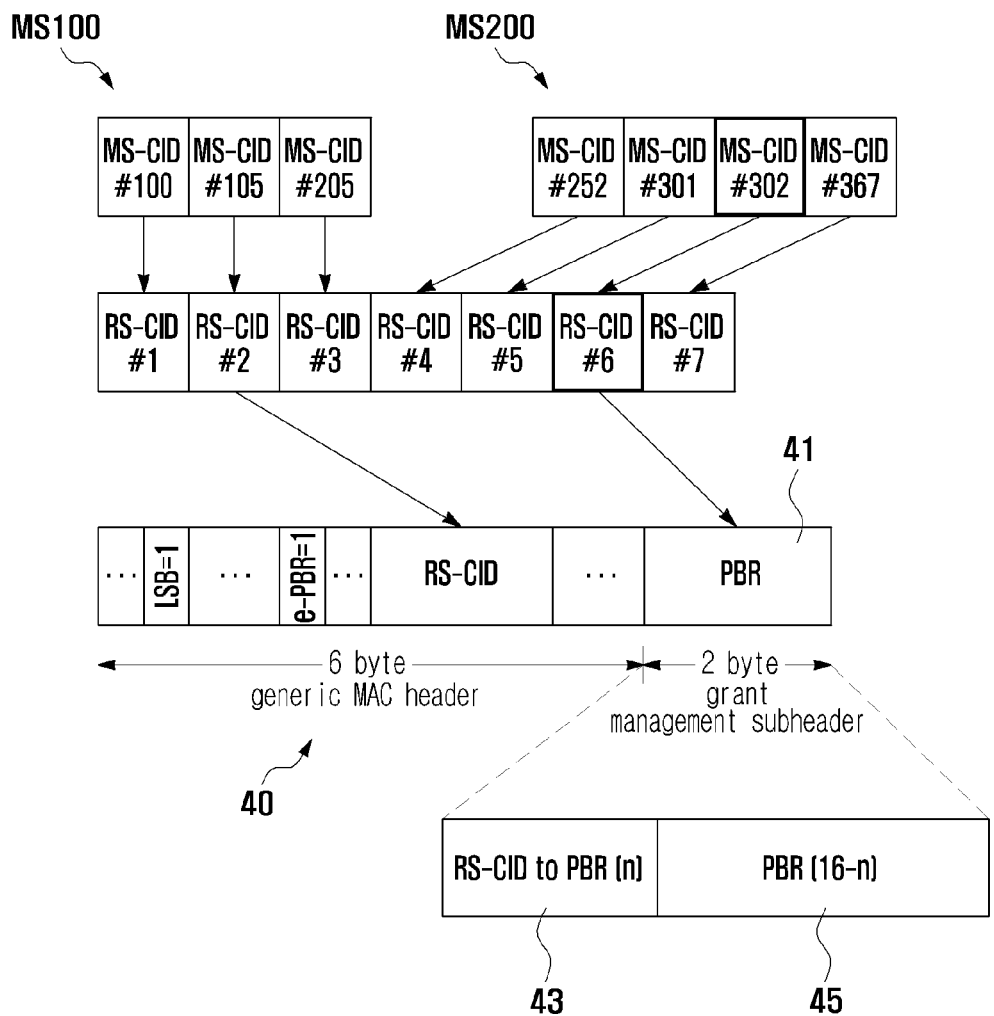
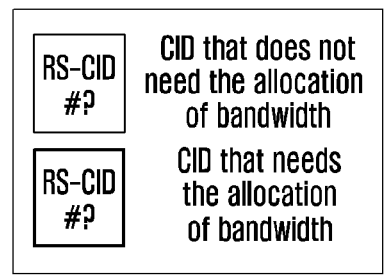

FIG. 5
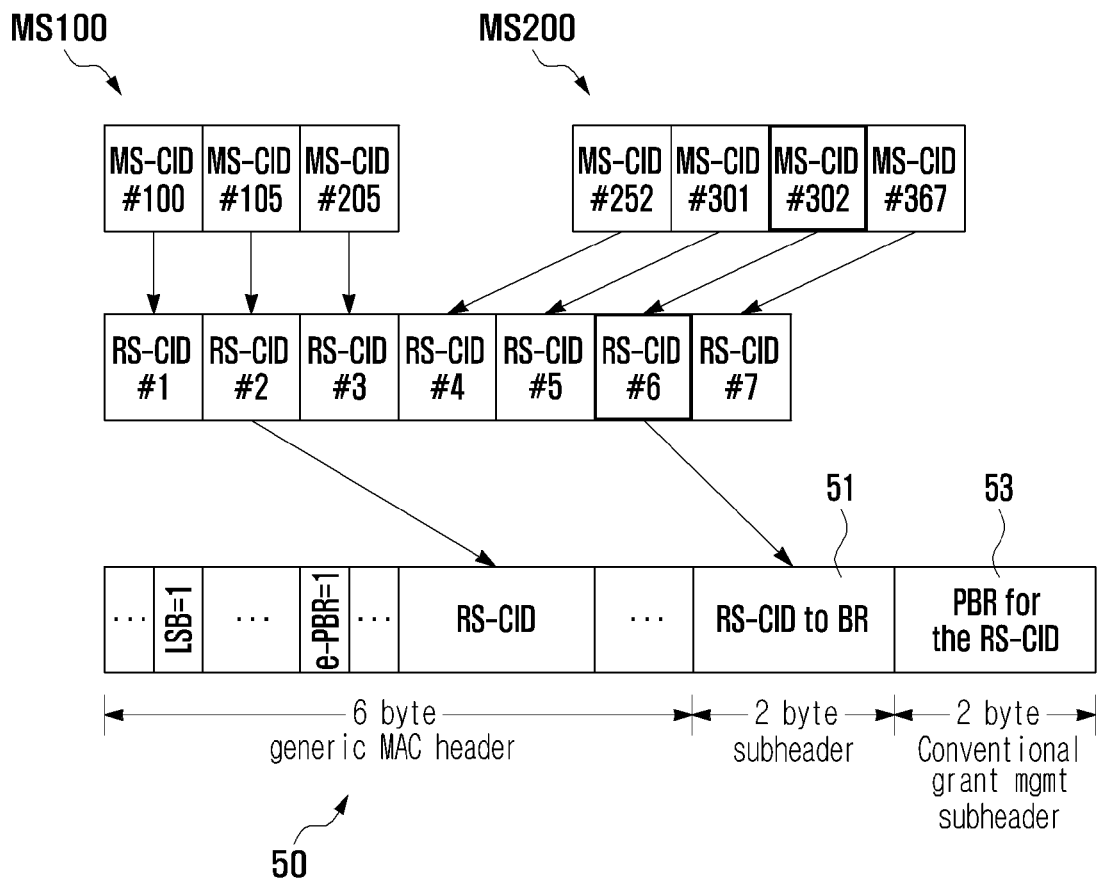
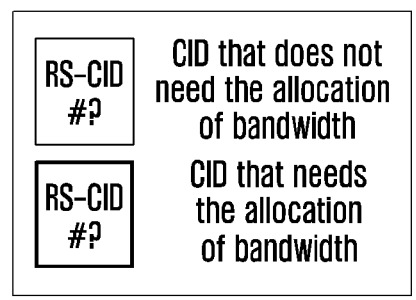

METHOD AND SYSTEM FOR REQUESTING ALLOCATION OF BANDWITH AND ALLOCATING BANDWITH IN A MULTI-HOP RELAY ENVIRONMENT

TECHNICAL FIELD

The present invention relates in general to a method and system for requesting the allocation of bandwidth and for allocating bandwidth in a multi-hop relay environment and, more particularly, to a method and system for more effectively requesting the bandwidth of mobile stations among a base station, a relay station and the mobile stations in the multi-hop relay environment.

BACKGROUND ART

Normally the cellular OFDMA system with a frequency reuse factor 1 such as IEEE802.16e may confront degradation in transmission ratio due to poor carrier-to-interference and noise ratio (CINR) near cell peripheries and therefore may restrict coverage performance due to service outage. In order to solve such problems, IEEE 802.16j TG in the IEEE 802.16 Wireless MAN standardization group is pushing ahead with the standardization of a multi-hop relay (MR) system based on cellular OFDMA. The MR system is composed of a repeater, i.e., a relay station (RS), which supports a radio relay function for connection of a mobile station (MS), and a base station (BS) which is connected with the MS or RS through a radio link and supports a radio relay function. The MS may directly communicate the MR-BS or may be connected with the MR-BS through two-hop using a single RS or multi-hop using several RSs. This system simultaneously offers an access zone of the MS and a relay zone between the RS and the MR-BS by means of time division of a single radio frequency channel, thus requiring no additional wired link for a relay link. Namely, the multi-hop relay system not only can increase yield by improving CINR performance of the adjoining MS through the RS, but also may cover a service outage area or expand cell coverage by installing the RS in a shaded zone. Accordingly, the multi-hop relay system may divide the entire cell into a number of small coverage regions through multi-hop RSs, and may realize an increase of system capacity through reuse of the same radio resources by all RSs.

Meanwhile, the MS accesses a specific server or other MS through the BS and then establishes downlink and uplink channels with the BS in order to use a certain service. Namely, the MS forms a downlink channel with the BS to receive data from a specific server or other MS, and also forms an uplink channel with the BS to upload or transmit data to a specific server or other MS. Particularly, the MS requests uplink bandwidth for data transmission to the BS and, for such a request, creates a separate bandwidth request message to be transmitted to the BS.

By the way, if there is any RS between the MS and the BS during a bandwidth request process of the MS, the MS sends a bandwidth request to the RS, and then the RS sends a message corresponding to the bandwidth request to the BS. So, if the MS uses several services or if several MSs use several services, the above messages for bandwidth requests are increased and hence this may incur an increase of message transmission load. Therefore, a method and system for a more effective bandwidth request are needed.

DISCLOSURE

Technical Problem

Accordingly, an aspect of the present invention is to provide a method and system for requesting the allocation of bandwidth and for allocating bandwidth in a multi-hop relay environment by allowing each relay station to integrate and manage bandwidth requests received from at least one mobile station, thus optimizing data transmission and reception for the bandwidth requests.

Technical Solution

According to one aspect of the present invention, provided is a method for requesting the allocation of bandwidth for at least one mobile station (MS) using several connection identifications (CIDs) in a multi-hop relay environment, the method comprising steps of: at a relay station (RS), ascertaining the CIDs of the MS that belongs to the RS; at the RS, detecting bandwidth requesting CID that requires the allocation of bandwidth, among the CIDs; at the RS, creating a field that contains a region for recording CID-related information of the bandwidth requesting CID and a region for recording bandwidth request information of the bandwidth requesting CID; and at the RS, adding the created field to a media access control (MAC) header that corresponds to CID of a packet transmitted to a base station (BS) among the CIDs.

According to another aspect of the present invention, provided is a method for allocating bandwidth at a base station (BS) in a multi-hop relay environment, the method comprising steps of: receiving a field that is added to an MAC header and contains a region for recording CID-related information of bandwidth requesting CID and a region for recording bandwidth request information of the bandwidth requesting CID; detecting CID from the CID-related information and also detecting bandwidth information of the detected CID from the bandwidth request information region; and allocating necessary bandwidth to a relay station (RS) according to the CID and the bandwidth request information.

According to still another aspect of the present invention, provided is a system for requesting the allocation of bandwidth for at least one mobile station (MS) using several connection identifications (CIDs) in a multi-hop relay environment, the system comprising: a relay station (RS) configured to ascertain the CIDs of the MS, to detect bandwidth requesting CID that requires the allocation of bandwidth among the CIDs, to create a field that contains a region for recording CID-related information of the bandwidth requesting CID and a region for recording bandwidth request information of the bandwidth requesting CID, and to add the created field to a media access control (MAC) header that corresponds to CID of a packet transmitted to a base station (BS) among the CIDs.

According to yet another aspect of the present invention, provided is a system for allocating bandwidth in a multi-hop relay environment, the system comprising: a relay station (RS) configured to transmit a field that is added to an MAC header and contains a region for recording CID-related information of bandwidth requesting CID and a region for recording bandwidth request information of the bandwidth requesting CID; and a base station (BS) configured to detect CID from the CID-related information, to detect bandwidth information of the detected CID from the bandwidth request information region, and to allocate necessary bandwidth to the RS according to the CID and the bandwidth request information.

Advantageous Effects

According to a method and system for requesting the allocation of bandwidth and for allocating bandwidth in a multi-hop relay environment proposed by embodiments of this invention, several bandwidth requests for several services are integrated and managed at each RS, so that a load for such bandwidth requests can be optimized and also resource requests of the MS can be quickly processed thanks to reduced or removed waiting time for bandwidth requests.

DESCRIPTION OF DRAWINGS

FIG. 4 is a view illustrating a single piggyback scheme based on an RS-CID list in accordance with an exemplary embodiment of the present invention.

FIG. 5 is a view illustrating a single piggyback scheme based on a conventional grant management sub-header in accordance with an exemplary embodiment of the present invention.

MODE FOR INVENTION

Exemplary, non-limiting embodiments of the present invention will now be described more fully with reference to the accompanying drawings. This invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

A mobile station (MS) which tries to use a certain service should have a specific identifier regarding that service. Connection identification (CID), formed for each service by the MS with a relay station (RS) or a base station (BS), may be used as such an identifier for identifying a particular service. Hereinafter, CID may refer to an identifier for differentiating each service from the others. Also, MS-CID may refer to CID corresponding to each service possessed by the MS, and RS-CID may refer to CID mapped to MS-CID by the RS according to a given rule. Therefore, the value of CID may be varied for each MS and RS. However, the MS that substantially possesses CID, a service corresponding to CID, etc. is unvarying.

Additionally, bandwidth information set forth herein may refer to information about the amount of bandwidth, which may be information about the bandwidth amount itself or be index information corresponding to the bandwidth amount.

Meanwhile, for each bandwidth request CID that requests the allocation of bandwidth, the RS writes a region for CID-related information and a region for bandwidth request information. The CID-related information may include CID information about the bandwidth request CID, sequence information of such CIDs arranged in a list according to a given rule, and information about bitmap created being based on the list of such CIDs.

Figure 1:
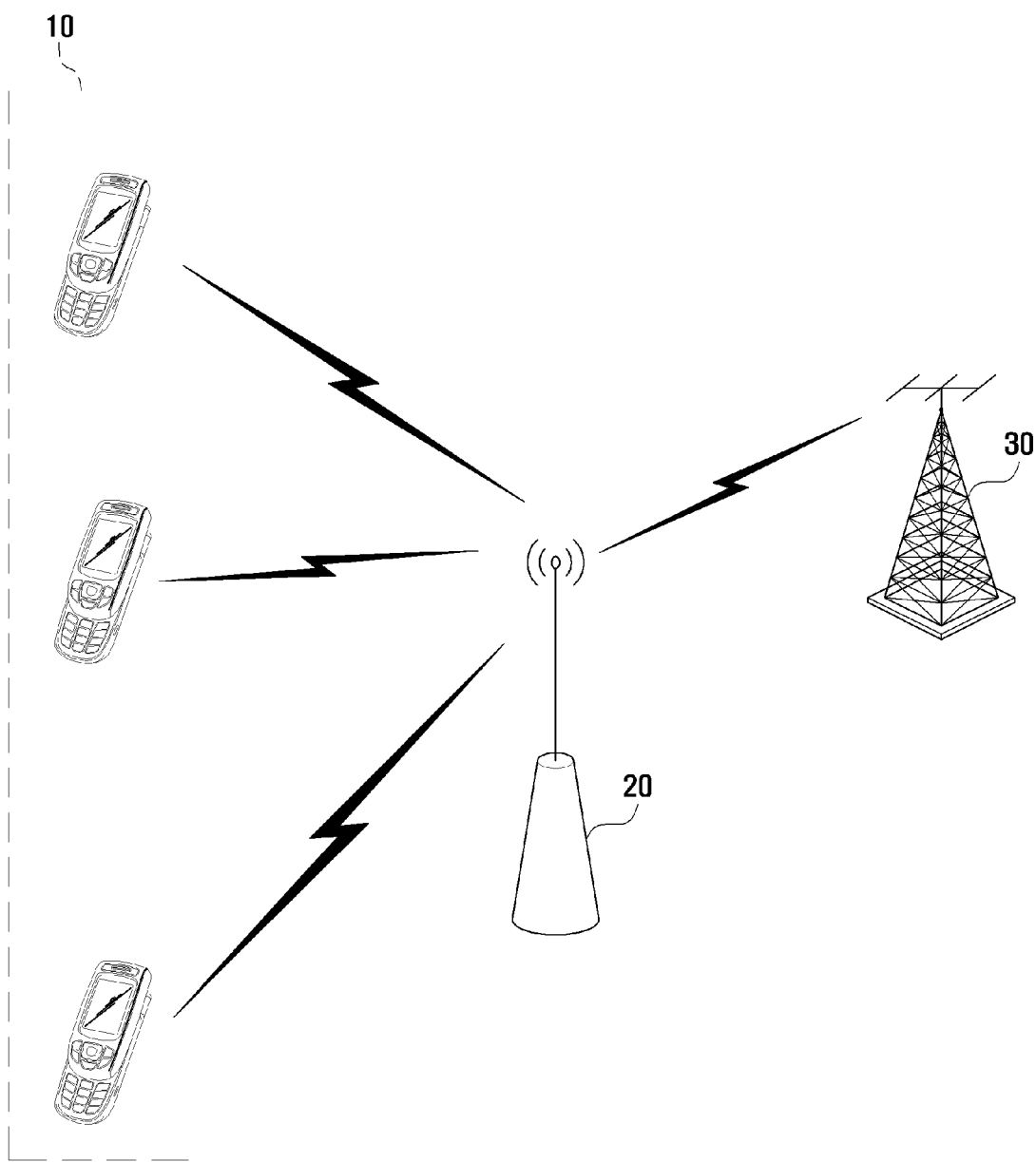
FIG. 1 is a schematic view illustrating a configuration of a system corresponding to a multi-hop relay environment in accordance with an exemplary embodiment of the present invention.

FIG. 1 is a schematic view illustrating a configuration of a system corresponding to a multi-hop relay environment in accordance with an exemplary embodiment of the present invention.

Referring to FIG. 1, the multi-hop relay environment may include the BS 30, the RS 20 and the MS 10. Although the multi-hop relay environment to be discussed herein employs a single RS 20, this is exemplary only and not to be considered as a limitation of the present invention. In an alternative embodiment, a plurality of RSs 20 may be connected to the BS 30, and each RS 20 may communicate with a plurality of MSs 10.

In a communication system of the multi-hop relay environment having the above configuration, at least one BS 10 requests bandwidth to the BS 30 through the RS 20, based on CID corresponding to each service currently used in the MS 10. At this time, if the MS 10 uses several services and thereby has several MS-CIDs, or if several MSs 10 use their own service and thereby request bandwidth depending on their own MS-CID, the RS 20 simultaneously classifies MS-CIDs of the MSs 10 and then requests bandwidth to the BS 30. Therefore, the RS 20 not only can prevent an increase of unnecessary overhead during a message transmission and reception for bandwidth requests of the MSs 10, but also can support writing of a bandwidth allocation request message optimized according to a system in a bandwidth request. Now, the respective elements are described in detail.

The BS 30 establishes a communication channel with the MS 10 through the RS 20. This communication channel may include a downlink (DL) channel for data transmission from the BS 30 to the RS 20 or from the BS 30 to the MS 10 via the RS 20, and an uplink (UL) channel for data transmission from the MS 10 or the RS 20 to the BS 30. The BS 30 periodically checks whether the RS 20 will request bandwidth or, when receiving a message corresponding to a bandwidth request from the RS 20, sends an UL map for bandwidth allocation to the RS 20. The UL map refers to a specific map about resources of the entire UL. This UL map may represent bandwidth that is currently available for the RS 20 and bandwidth that has been already allocated to other RS 20 or other MS 10.

Additionally, the BS 30 transmits and receives necessary information to and from the RS 20 in the initialization process. Through this process, the BS 30 can know which RS 20 exists in its communication area and also can know which RS 20 uses which RS-CID. Furthermore, since the BS 30 receives from the RS 20 information about the entry of the MS 10 into the area of the RS 20, the BS 30 can know which MS 10 exists in which RS 20. Therefore, the BS 30 can create and manage, for each RS, a list of RS-CID corresponding to MS-CID of the MS.

Figure 2:
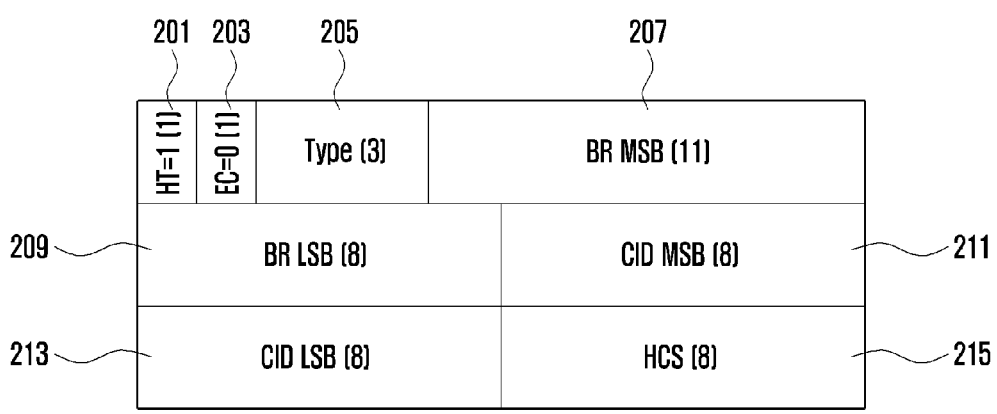
FIG. 2 is a view illustrating a structure of an MAC signaling header in accordance with an exemplary embodiment of the present invention.

The MS 10 establishes a communication channel with the BS 30 through the RS 20 and then may request the allocation of bandwidth to the BS 30 via the RS 20 in order to perform a particular service, e.g., data transmission toward the BS 30. For instance, for uploading or transmission of a photo, a document or a mail through the UL, the MS 10 may request the allocation of bandwidth to the BS 30 via the RS 20 and, when bandwidth is allocated, may perform a selected service. Meanwhile, depending on the circumstances, a single MS 10 may use several services, and two or more MSs 10 may use several services. Here, in order to distinguish each service from the others and also to maintain a currently used service, the MS 10 creates various messages (e.g., a message for maintaining a current service, a message for requesting bandwidth allocation, etc.) based on CID (i.e., MS-CID) predefined and corresponding to each service, and then sends them to the RS 20. Also, a single MS 10 may use several services and thereby may employ several MS-CIDs. Alternatively, several MSs 10 may employ several MS-CIDs. Therefore, when requesting the allocation of bandwidth for use of a particular service, each MS 10 writes a bandwidth request header having each CID, as shown in FIG. 2, and then sends it to the RS 20. Referring to FIG. 2, the bandwidth request header may include a header type (HT) filed 201, an encoding (EC) field 203, a type filed 205, bandwidth request (BR MSB (11), BR LSB (8)) fields 207 and 209, CID fields 211 and 213, and a header check sequence (HCS) field 215.

The RS 20 establishes communication channels with the MS 10 and with BS 30 and then transmits data from the MS 10 to the BS 30 and vice versa. Specifically, the MS 10 uses MS-CID for a service initialization and service maintenance during the use of a particular service. If the allocation of bandwidth is required for additional data transmission, the MS 10 creates an MS-CID message containing request information about bandwidth allocation for each MS-CID and then sends each MS-CID message to the RS 20.

At this time, if there is any UL packet transmitted to the BS through the RS, the RS 20 may write information about RS-CID mapped to MS-CID of a bandwidth request as well as bandwidth request information in a piggyback request header that is a type of grant management sub-header connected to a generic MAC (media access control) header, and then may send it to the BS.

Alternatively, the RS 20 may detect CID information and required bandwidth allocation information from the first one of MS-CID messages requesting the allocation of bandwidth, and then creates an RS-CID message corresponding to the bandwidth request MS-CID by writing the detected information and RS-CID mapped to the above MS-CID in a generic MAC header. Additionally, for the second MS-CID message requesting the allocation of bandwidth, the RS 20 determines RS-CID through its mapping, writes the determined RS-CID and required bandwidth allocation request information in a sub-header connected to the generic MAC header, and then transmits this message to the BS 30.

Thereafter, the RS 20 receives the UL map corresponding to the above RS-CID message from the BS 30 and ascertains grantable bandwidth in the UL map. Then, based on this, the RS 20 allocates bandwidth requested by the MS 10 to the MS 10 for each MS-CID.

In other words, the RS 20 may perform a bandwidth allocation request process by creating RS-CID corresponding to MS-CID of the MS 10, adding a grant management sub-header to a generic MAC header based on a specific MS-CID, and then sending it to the BS 30. In addition, the RS 20 may perform such a process by adding an extended sub-header to a specific generic MAC header transmitted to the BS 30. Also, in case of having to process the bandwidth allocation requests many times, the RS 20 may add several grant management sub-headers to the generic MAC header.

Now, a generic MAC header used by the RS 20 is described in detail with reference to FIG. 3.

Figure 3:
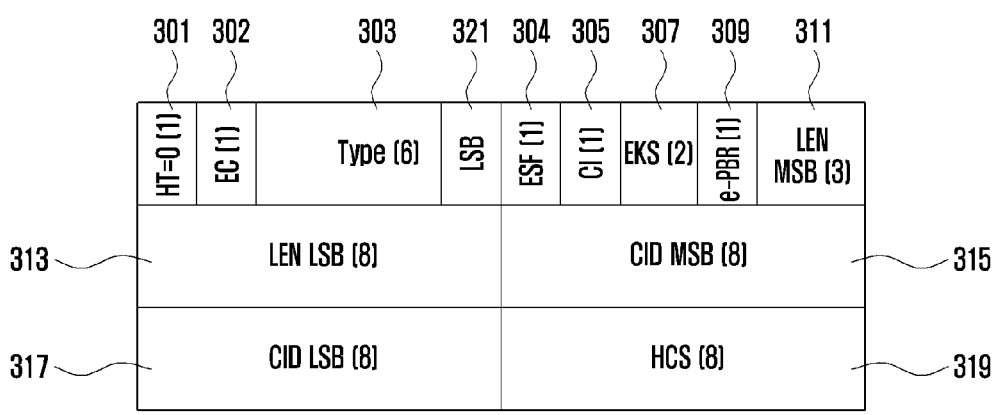
FIG. 3 is a view illustrating a structure of a generic MAC header in accordance with an exemplary embodiment of the present invention.

FIG. 3 is a view illustrating a structure of a generic MAC header in accordance with an exemplary embodiment of the present invention.

Referring to FIG. 3, the generic MAC header includes a header type (HT) field 301, an encoding (EC) field 302, a type field 303, an extended sub-header field (ESF) 304 indicating whether an extended sub-header is present or not, a CRC indicator (CI) field 305 indicating a cyclic redundancy check (CRC) error, an encryption key sequence (EKS) field 307 having information about a key used for payload encryption, an extended piggyback request (e-PBR) field 309 which is newly defined in the present invention, length (LEN) fields 311 and 313, CID fields 315 and 317, and a header check sequence (HCS) field 319. Here, some indicators defining various types may be entered in the type field 303, which may especially include a least significant bit (LSB) 321 used for a definition of a message for a bandwidth allocation request of the invention.

Meanwhile, a piggyback request scheme is to set up the LSB of the type field 303 in the generic MAC header in order for the grant management sub-header to be added. Namely, the piggyback request scheme is a way to request the allocation of bandwidth by setting the type filed LSB 321 to '1', adding the 2-byte grant management sub-header, which records information about bandwidth allocation request necessary for corresponding CID, to the generic MAC header, and then performing transmission. Here, the grant management sub-header records information about how many bytes of bandwidth are further required for the corresponding CID to which certain bandwidth has been already allocated. This information recorded in the grant management sub-header may be varied according to service classes of the CID. The grant management sub-header format may be represented as Table 1 given below.

TABLE 1

| Syntax | Size(bits) | Notes |
|---|---|---|
| Grant management subheader( ){ | D | D |
| If(scheduled service type == UGS){ | D | D |
| SI | 1 | D |
| PM | 1 | D |
| FU | 1 | D |
| FL | 4 | D |
| Reserved | 9 | Shall be set to zero |
| }else if(scheduled service type = extended rtps)} | D | D |
| Extended Piggyback Request | 11 | D |
| FU | 1 | D |
| FL | 4 | D |
| }else{ D | D | D |
| PiggyBack Request | 16 | D |
| } | D | D |
| } | D | D |

Table 1 exemplarily shows the grant management sub-header format of the unsolicited guaranteed service (UGS) and the extended real time polling service (rtPS). However, the contents of the grant management sub-header may be varied according to service classes. In addition to the above-mentioned UGS and the extended rtPS, such scheduling service classes may be an rtPS, a non real time polling service (nrtPS), and a best effort (BE) service.

Table 2 shows fields of the grant management sub-header.

TABLE 2

| Name | Length (bits) | Description |
|---|---|---|
| SI | 1 | Slip indicator( ) = No Action1 = Used by the MS to indicate a Slip of uplink grants relative to the uplink queue depth |
| PM | 1 | Poll-Me0 = No Action1 = used by the MS to request a bandwidth poll |
| FU | 1 | Frame Latency indication0 = Frame latency field disabled for this grant1 = Frame latency field enabled for this grant |
| FL | 4 | Frame Latency. The number of frames previous to the current one in which the transmitted data was available. When the latency is greater than 15 then the FL field shall be set to 15. |
| Extended PBR | 11 | Extended PiggyBack Request. The number of bytes of uplink bandwidth requested by the MS. The bandwidth request is for the CID. The request shall not include any PHY overhead. The request shall be incremental. In case of the extended rtPS, if the MSB is 1, the BS changes its polling size into the size specified in the LSBs of this field. |

TABLE 2-continued

| Name | Length (bits) | Description |
|---|---|---|
| PiggyBack Request | 16 | PiggyBack Request. The number of bytes uplink bandwidth requested by the MS. |

In the above-discussed generic MAC header structure, a bandwidth allocation request method proposed by this invention includes a method in which the RS 20 performs a single piggyback scheme for other CID of the MS or CID of other MS corresponding to CID of the generic MAC header and then requests the allocation of bandwidth, and another method in which the RS 20 performs a multiple piggyback scheme for several CIDs of the MS corresponding to CID of the generic MAC header and then requests the allocation of bandwidth. Such methods may be discriminated by a combination of the type field LSB 321 and the e-PBR 309 bit in the generic MAC header structure. This will be described in more detail with reference to Table 3.

TABLE 3

| LSB field | e-PBR bit | Operation |
|---|---|---|
| 0 | 0 | No piggyback |
| 1 | 0 | RS-CID of generic MAC header performs BR with piggyback |
| 1 | 1 | Single piggyback that allows piggyback of other RS-CID in RS to which RS-CID of generic MAC header belongs |
| 0 | 1 | Multiple piggyback |

As shown in Table 3, the bandwidth allocation request method offered by the RS 20 may be classified into four schemes according to a combination of the type field LSB and the e-PBR. Specifically, in case of performing no piggyback, the RS 20 sets each of the LSB bit and the e-PBR bit of the generic MAC header to "0". Additionally, in case where CID that needs the allocation of bandwidth would like to request the allocation of bandwidth by performing a piggyback based on a single CID contained in the generic MAC header, the RS 20 sets the LSB bit to "1" and the e-PBR bit to "0". Particularly, in case where CID that needs the allocation of bandwidth is other than the MS corresponding to CID contained in the generic MAC header, the RS 20 of this invention performs a single piggyback by setting the LSB bit to "1" and the e-PBR bit to "1". Finally, in case of a multiple piggyback that requests the allocation of bandwidth for several CIDs different from CID contained in the generic MAC header, the RS 20 sets the LSB bit to "0" and the e-PBR bit to "1".

Hereinafter, in a method for requesting the allocation of bandwidth according to embodiments of this invention, a prearranged region of the generic MAC header is defined as the e-PBR for each of a single piggyback scheme and a multiple piggyback scheme, In addition, a way of adding a sub-header according to the definitions of the LSB field and the e-PBR field, and a way of using an extended sub-header is described in detail with reference to the drawings.

First, in a single piggyback scheme and a multiple piggyback scheme, bandwidth allocation request methods based on a generic MAC header and a sub-header connected thereto are described with reference to FIGS. 4 to 8.

FIG. 4 is a view illustrating a single piggyback scheme based on an RS-CID list in accordance with an exemplary embodiment of the present invention. Namely, FIG. 4 shows a process of a bandwidth allocation request using the RS-CID list in the single piggyback scheme using the generic MAC header and the sub-header.

Since the BS allocates CID to each MS, the BS knows the MS that exists in its coverage and also knows CID of each MS. When the MS is connected to a certain RS, the BS offers such information about the MS to the RS. Therefore, the RS can know all CID information about the MS connected thereto.

Referring to FIG. 4, in this single piggyback scheme, the first MS (MS 100) has three CIDs, namely MS-CID #100, MS-CID #105 and MS-CID #205, and the second MS (MS 200) has four CIDs, namely MS-CID #252, MS-CID #301, MS-CID #302 and MS-CID #367.

The RS 20 performs a mapping between each MS-CID of the first MS (MS 100) and its own RS-CID and between each MS-CID of the second MS (MS 200) and its own RS-CID. For instance, the RS 20 may perform a mapping to connect RS-CID #1, RS-CID #2 and RS-CID #3 to MS-CIDs of the first MS (MS 100), respectively, and also to connect RS-CID #4, RS-CID #5, RS-CID #6 and RS-CID #7 to MS-CIDs of the second MS (MS 200), respectively. This mapping process depends on a predefined CID matching form, and this invention is not limited to the above CID numbers. After an RS-CID mapping is completed, the RS 20 arranges RS-CIDs according to a given rule and then makes a list of the arranged RS-CIDs.

Herein, let's suppose that RS-CID #2 corresponding to MS-CID #105 transmitted from the first MS (MS 100) is contained in a message transmitted to the BS 30, and that MS-CID #302 transmitted from the second MS (MS 200) is a bandwidth requesting CID. In this case, the RS 20 makes a generic MAC header 40 containing RS-CID #2 and also sets each of the LSB field and the e-PBR field of the generic MAC header 40 to "1". Then the RS 20 writes PBR information related to RS-CID #6 (i.e., RS-CID information of RS-CID #6 and bandwidth allocation request information needed by RS-CID) in the 2-byte grant management sub-header 41 added to the generic MAC header 40. For this, the RS 20 divides the grant management sub-header 41 into two regions, namely an RS-CID to PBR(n) region 43 and a PBR(16-n) region 45. Then the RS 20 may write bandwidth requesting CID information or any information corresponding to the bandwidth requesting CID information in the RS-CID to PBR(n) region 43 and also may write required bandwidth allocation request information in the PBR(16-n) region 45. At this time, since 2 bytes are allocated to the grant management sub-header 41, if CID information of RS-CID #6 exceeds certain bits (e.g., 5 bits), it is desirable to use a scheme shown in FIG. 5 instead of using "reduced RS-CID" based on the RS-CID list. Since "reduced RS-CID" is created by being based on the RS-CID list, all RS-CIDs based on MS-CIDs that belong to the first MS (MS 100) and the second MS (MS 200) are arranged by the RS as discussed above. At this time, the RS can know the location of each RS-CID in the RS-CID list. Therefore, the RS can 20 know that RS-CID #6 is located at the sixth position in the RS-CID list and may use "6" as reduced RS-CID information. When the RS 20 transmits to the BS 30 a message containing the grant management sub-header 41 added to the generic MAC header 40 on the basis of such reduced RS-CID information, the BS 30 can ascertain which RS sends the RS-CID list, by checking RS-CID of the generic MAC header 40. Also, by checking the reduced RS-CID information and the contents recorded in the grant management sub-header 41, the BS 30 can know how many bytes of bandwidth are required for each MS-CID.

The size n of the "RS-CID to PBR" field may be calculated through Equation 1.

$$n=\min(5\cdot m) \quad \text{[Equation 1]}$$

Here, if k is the number of CIDs arranged in the RS-CID list of the RS to which CID of the generic MAC header belongs, m is selected to satisfy $2^m \geq k$. For instance, if the total number of CIDs in the RS-CID list is 12, it is possible that k=12, m=4 and n=4 for $2^4 \geq 12$. If the minimum required size of the PBR field is 11 bits, the field size n of the "RS-CID to PBR" may be allowed up to 5 bits.

Meanwhile, if the number of CIDs in the RS-CID list is greater than a certain number expressible by the size of the RS-CID to PBR field, the RS 20 cannot perform a proper distinction of CIDs. For instance, if the size of the RS-CID to PBR field is "5", the RS 20 can distinguish up to total 32 CIDs but cannot distinguish CIDs more than 32. Therefore, the RS 20 supports a proper bandwidth allocation request using a data structure as shown in FIG. 5.

FIG. 5 is a view illustrating a single piggyback scheme based on a conventional grant management sub-header in accordance with an exemplary embodiment of the present invention. Namely, FIG. 5 shows a way of adding a field for a bandwidth requesting RS-CID to the generic MAC header and also adding a piggyback sub-header containing bandwidth request information of the RS-CID thereto, in case where it is difficult to use reduced RS-CID when a request for bandwidth is received from other CID of the RS to which CID of the generic MAC header belongs. In this case, it is possible to use a conventional grant management sub-header as a piggyback header.

Referring to FIG. 5, the RS 20 establishes RS-CIDs mapped to MS-CIDs of the first and second MSs (MS 100 and MS 200) and, based thereon, may make an RS-CID list. If one (e.g., RS-CID #6) of CIDs contained in the RS-CID list has contents requesting the allocation of bandwidth, the RS 20 transmits a message, as shown, to the BS. In this case, the RS 20 uses a conventional grant management sub-header 53, discussed earlier in Table 1, for a bandwidth allocation request for RS-CID #6. Here, the conventional grant management sub-header 53 contains only "PBR for the RS-CID" information that is bandwidth allocation request information required for RS-CID #6. Therefore, a 2-byte sub-header 51 that contains "RS-CID to PBR" information having RS-CID #6 information is transmitted together with the conventional grant management sub-header 53.

Namely, the RS 20 adds the sub-header 51 as well as the conventional grant management sub-header 53 to the generic MAC header 50 containing RS-CID #2 information and then transmits it to the BS 30.

Meanwhile, the BS 30 that receives the aforesaid message from the RS 20 checks the LSB bit and the e-PBR bit of the generic MAC header 50. If each bit is set to "1", the BS 30 can know that the received message is for a single piggyback. Then the BS 30 detects CID information corresponding to bandwidth requiring RS-CID #6 from the sub-header 51, detects bandwidth required for RS-CID #6 through the conventional grant management sub-header 53, and allocates the detected bandwidth to the RS 20.

Here, the RS 20 may not need to make a separate RS-CID list when writing bandwidth allocation request information of the RS-CID by using the conventional grant management sub-header 53 and also writing CID information of RS-CID #6 by using the sub-header 51. Additionally, even though using MS-CID itself instead of using RS-CID to which MS-CID is mapped, the RS 20 may transmit a message for requesting the same bandwidth.

As discussed, in a single piggyback scheme of this invention, the method for requesting the allocation of bandwidth can minimize CID-related information for a bandwidth allocation request by sending it through the generic MAC header transmitted to the BS 30, thus minimizing a load caused by message transmission for a bandwidth allocation request. Additionally, the bandwidth allocation request method according to a single piggyback scheme of this invention can be performed regardless of polling cycle of the BS 30 for a check of a bandwidth allocation request, thus minimizing an unnecessary time delay.

Next, in a multiple piggyback scheme, a bandwidth allocation request method is described.

Figure 6:
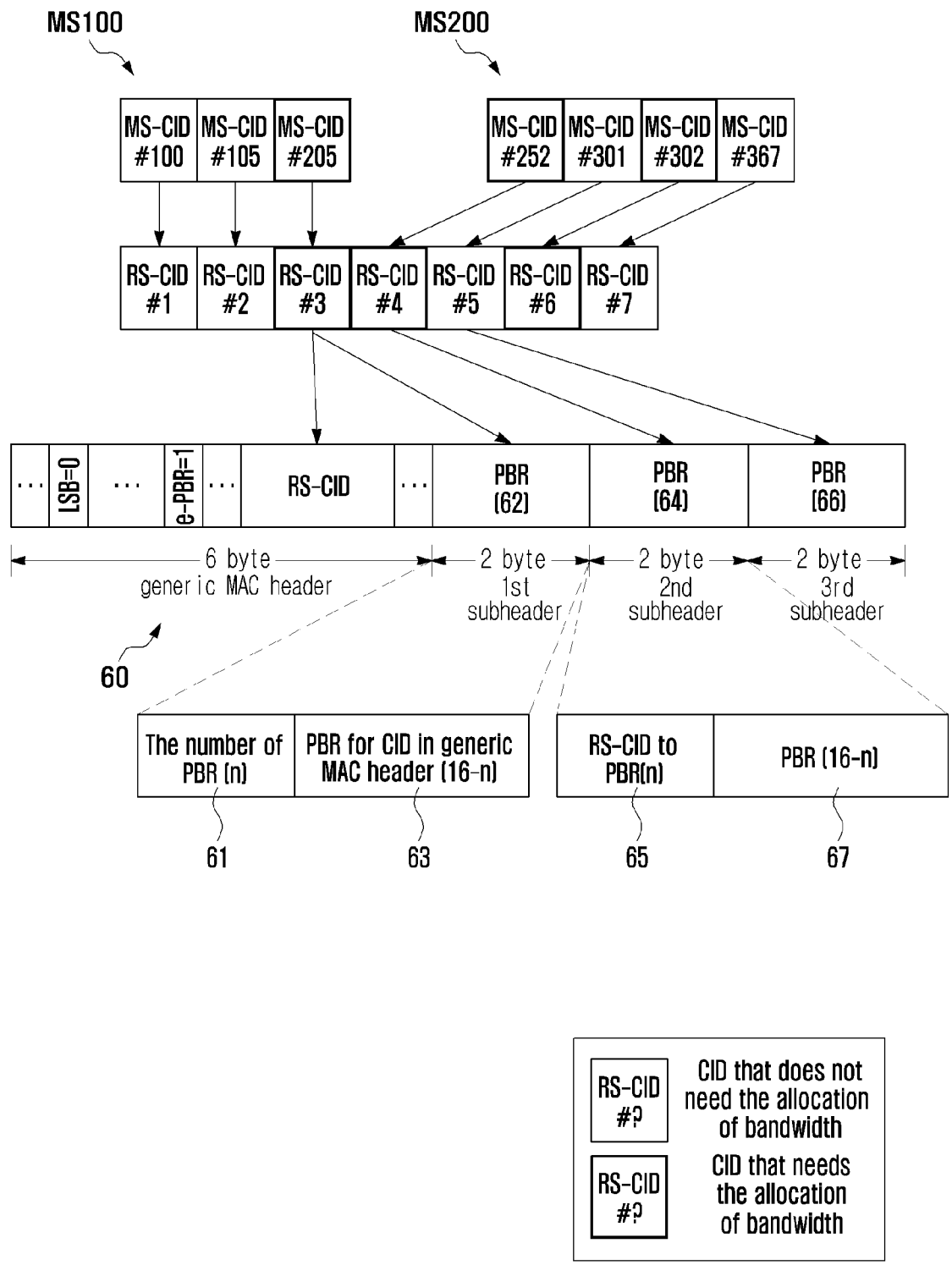
FIG. 6 is a view illustrating a multiple piggyback scheme based on an RS-CID list in accordance with an exemplary embodiment of the present invention.

FIG. 6 is a view illustrating a multiple piggyback scheme based on an RS-CID list in accordance with an exemplary embodiment of the present invention. Namely, FIG. 6 shows a process of arranging bandwidth requesting RS-CIDs in order according to the RS-CID list and then making a message in the multiple piggyback scheme.

Referring to FIG. 6, the RS 20 creates an RS-CID list by arranging MS-CIDs of the first and second MSs (MS 100 and MS 200) according to a given rule. Namely, the RS 20 performs a mapping so that MS-CID #100, MS-CID #105 and MS-CID #205 of the first MS (MS 100) and MS-CID #252, MS-CID #301, MS-CID #302 and MS-CID #367 of the second MS (MS 200) may be mapped to its own prearranged RS-CIDs according to a given rule. Specifically, MS-CID #100 is mapped to RS-CID #1, MS-CID #105 is mapped to RS-CID #2, and MS-CID #205 is mapped to RS-CID #3. Additionally, MS-CID #252 is mapped to RS-CID #4, MS-CID #301 is mapped to RS-CID #5, MS-CID #302 is mapped to RS-CID #6, and MS-CID #367 is mapped to RS-CID #7. This invention is not limited to the above CID mapping numbers, which may be varied according to a given rule.

Herein, let's suppose that MS-CID #205 of the first MS (MS 100) and MS-CIDs #252 and #302 of the second MS (MS 200) are bandwidth requesting MS-CIDs.

In the above mapping process, the RS 20 checks whether there is any MS-CID having contents for a bandwidth allocation request among MS-CIDs of the first and second MSs (MS 100 and MS 200). At this time, in order to request the allocation of bandwidth to the RS, the first and second MSs (MS 100 and MS 200) may perform in general a conventional bandwidth request process. Then the RS 20 creates a bandwidth allocation request message, as shown, based on the RS-CID list that contains RS-CID #3, RS-CID #4 and RS-CID #6 corresponding to the respective bandwidth requesting MS-CIDs. Here, by setting the LSB bit of the message to "0" and the e-PBR bit to "1", the RS 20 may indicate that the message is to request the allocation of bandwidth for several CIDs. After writing CID information of RS-CID #3 in the CID field of the generic MAC header 60, the RS 20 writes sub-headers added to the generic MAC header 60. These sub-headers may include the first sub-header 62 for recording PBR corresponding to bandwidth allocation request information of RS-CID #3, the second sub-header 64 for recording PBR corresponding to bandwidth allocation request information of RS-CID #4, and the third sub-header 66 for recording PBR corresponding to bandwidth allocation request information of RS-CID #6.

The first sub-header 62 has a "The number of PBR(n)" region 61 and a "PBR for CID in generic MAC header(16-n)" region 63. The "The number of PBR(n)" region 61 indicates the total number of PBRs requesting the allocation of bandwidth. Here, the size n may be calculated through Equation 1 described earlier. The "PBR for CID in generic MAC header(16-n)" region 63 records bandwidth allocation request information (e.g., bytes of bandwidth) required by RS-CID #3.

Each of the second and third sub-headers 64 and 66 has an "RS-CID to PBR(n)" region 65 and a "PBR(16-n)" region 67. The "RS-CID to PBR(n)" region 65 of the second sub-header 64 may record information (i.e., "4") about the location of RS-CID #4 in the RS-CID list, and the "RS-CID to PBR(n)" region of the third sub-header 66 may record information (i.e., "6") about the location of RS-CID #6 in the RS-CID list. Additionally, the "PBR(16-n)" region 67 of the second sub-header 64 records bandwidth allocation request information required for RS-CID #4, and the "PBR (16-n)" region of the third sub-header 66 records bandwidth allocation request information required for RS-CID #6.

Then the RS 20 transmits to the BS 30 the above message, namely, including the generic MAC header 60 containing CID of RS-CID #3, the first sub-header 62 containing the total number of sub-headers and bandwidth allocation request information about RS-CID #3, the second sub-header 64 containing CID information and bandwidth allocation request information about RS-CID #4, and the third sub-header 66 containing CID information and bandwidth allocation request information about RS-CID #6.

Then the BS 30 receives the above message and checks the LSB bit and the e-PBR bit of the generic MAC header 60. If both bits are set to "0" and "1", respectively, the BS 30 recognizes the received message to be a multiple piggyback message. Additionally, the BS 30 can know how many CIDs request the allocation of bandwidth by checking the first sub-header 62, and also can know the total amount of bandwidth allocation by checking the respective sub-headers. Then the BS 30 offers a corresponding bandwidth allocation map (e.g., the UL map) to the RS 20.

When receiving the UL map from the BS 30, the RS 20 checks available bandwidth allocation regions from the UL map, creates an UL-MAP based thereon, and sends it to the first and second MSs (MS 100 and MS 200). Then each of the first and second MSs (MS 100 and MS 200) recognizes bandwidth allocation for corresponding MS-CID from the RS 20 and may perform data transmission through the allocated bandwidth.

As discussed, in case of having several MS-CIDs that request the allocation of bandwidth, the RS 20 creates the RS-CID list based on all MS-CIDs within its coverage, and also fixes the order of bandwidth requesting RS-CIDs. Then, for each CID, the RS 20 adds a sub-header for a bandwidth allocation request to the generic MAC header for specific RS-CID to be transmitted to the BS 30 while using an index value of each CID as the sequence number of each CID. Therefore, the RS 20 can minimize the size of a bandwidth allocation request message through a process of adding a 2-byte sub-header for each bandwidth requesting CID, thus allowing an integrated management of several bandwidth requesting CIDs.

Meanwhile, the RS 20 may support a quick distinction of bandwidth requesting RS-CIDs by mapping all CIDs to certain bitmaps. For this, the RS 20 may make a message as shown in FIG. 7.

Figure 7:
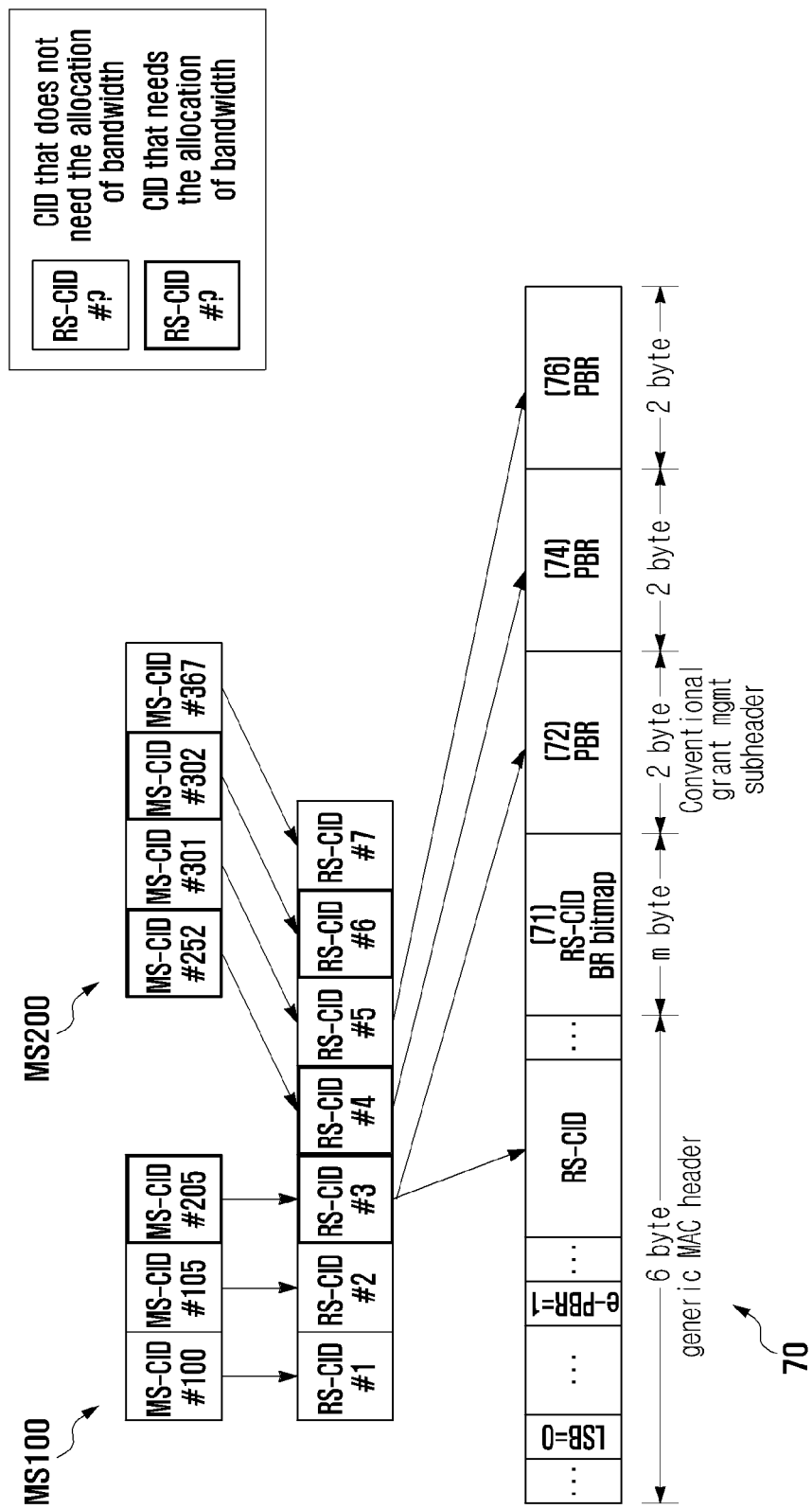
FIG. 7 is a view illustrating a multiple piggyback scheme based on a bitmap in accordance with an exemplary embodiment of the present invention.

FIG. 7 is a view illustrating a multiple piggyback scheme based on a bitmap in accordance with an exemplary embodiment of the present invention. Namely, FIG. 7 shows a process of making a bandwidth allocation request message by mapping all RS-CIDs to bitmaps in the multiple piggyback scheme.

Referring to FIG. 7, the RS 20 creates an RS-CID list by arranging MS-CIDs according to a given rule. Namely, the RS 20 performs a mapping between MS-CID and RS-CID. Specifically, MS-CID #100 is mapped to RS-CID #1, MS-CID #105 is mapped to RS-CID #2, and MS-CID #205 is mapped to RS-CID #3. Additionally, MS-CID #252 is mapped to RS-CID #4, MS-CID #301 is mapped to RS-CID #5, MS-CID #302 is mapped to RS-CID #6, and MS-CID #367 is mapped to RS-CID #7. This invention is not limited to the above CID mapping numbers, which may be varied according to a given rule.

Herein, let's suppose that MS-CID #205 of the first MS (MS 100) and MS-CIDs #252 and #302 of the second MS (MS 200) are bandwidth requesting MS-CIDs.

In order to request the allocation of bandwidth, the first and second MSs (MS 100 and MS 200) may use a conventional method for requesting bandwidth to the BS.

Next, the RS 20 allocates "0" to MS-CID that does not request bandwidth allocation, and allocates "1" to MS-CID that requests bandwidth allocation. Consequently, RS-CID #3, RS-CID #4 and RS-CID #6, corresponding to each MS-CID that requests the allocation of bandwidth, are assigned "1" and the other RS-CIDs are assigned "0". Therefore, in case of this example, the RS 20 may create a bitmap "0011010" corresponding to the entire RS-CID list.

After the above bitmap creation process is completed, the RS 20 writes the generic MAC header 70 based on CID contained in specific RS-CID (e.g. RS-CID #2) to be transmitted to the BS 30 and also sets the LSB bit and the e-PBR bit of the generic MAC header 70 to "0" and "1", respectively. Then the RS 20 writes a sub-header 71 that is added to the generic MAC header 70 and also records the aforesaid bitmap information "RS-CID BR bitmap". Additionally, the RS 20 writes conventional grant management sub-headers 72, 74 and 76 that are added to the above sub-header 71 and record bandwidth allocation request information for each CID, and then performs a piggyback request.

Thereafter, the RS 20 transmits to the BS 30 a message that contains the generic MAC header 70 corresponding to RS-CID #2, the sub-header 71 adjoining the generic MAC header 70 and containing RS-CID BR bitmap, and conventional grant management sub-headers 72, 74 and 76 adjoining the sub-header 71 and containing bandwidth allocation request information detected from RS-CID #3, RS-CID #4 and RS-CID #6. Here, the RS 20 may fix RS-CID BR bitmap to a specific bit or may apply flexibly it. In case where the RS 20 fixes the size of RS-CID BR bitmap, for example, to 2 bytes, the total number of RS-CIDs processed by the RS 20 does not exceed 16. Also, in case of 2-byte bitmap, the RS 20 may assign the aforesaid bitmap "0011010" to former 7 bits and assign "0" to the other bits. Therefore, the entire bitmap may become "0011010000000000".

The BS 30 receives the message from the RS 20 and checks the LSB bit and the e-PBR bit of the generic MAC header 70. If both bits are set to "0" and "1", respectively, the BS 30 recognizes the received message to be for a multiple piggyback. Additionally, the BS 30 can know which RS-CID requires bandwidth allocation by checking bitmap, and also can know the amount of bandwidth actually required by the RS-CID by checking conventional sub-headers 72, 74 and 76 added to the sub-header 71. In this process, the BS 30 makes an UL map for the allocation of required bandwidth by matching the order of conventional sub-headers and CID of RS-CID requiring bandwidth allocation, and then sends the UL map to the RS 20.

When receiving the UL map from the BS 30, the RS 20 controls proper bandwidth allocation, based on the received UL map, for MS-CID of each MS that requires bandwidth allocation.

As discussed, in case where the total number of CIDs is expressible with a certain bitmap, the bandwidth allocation request method using bitmap among a multiple piggyback scheme may quickly make and recognize an index for distinction of CIDs requiring bandwidth allocation, and may write bandwidth allocation request information in a conventional grant management sub-header to thereby support the allocation of required bandwidth.

Figure 8:
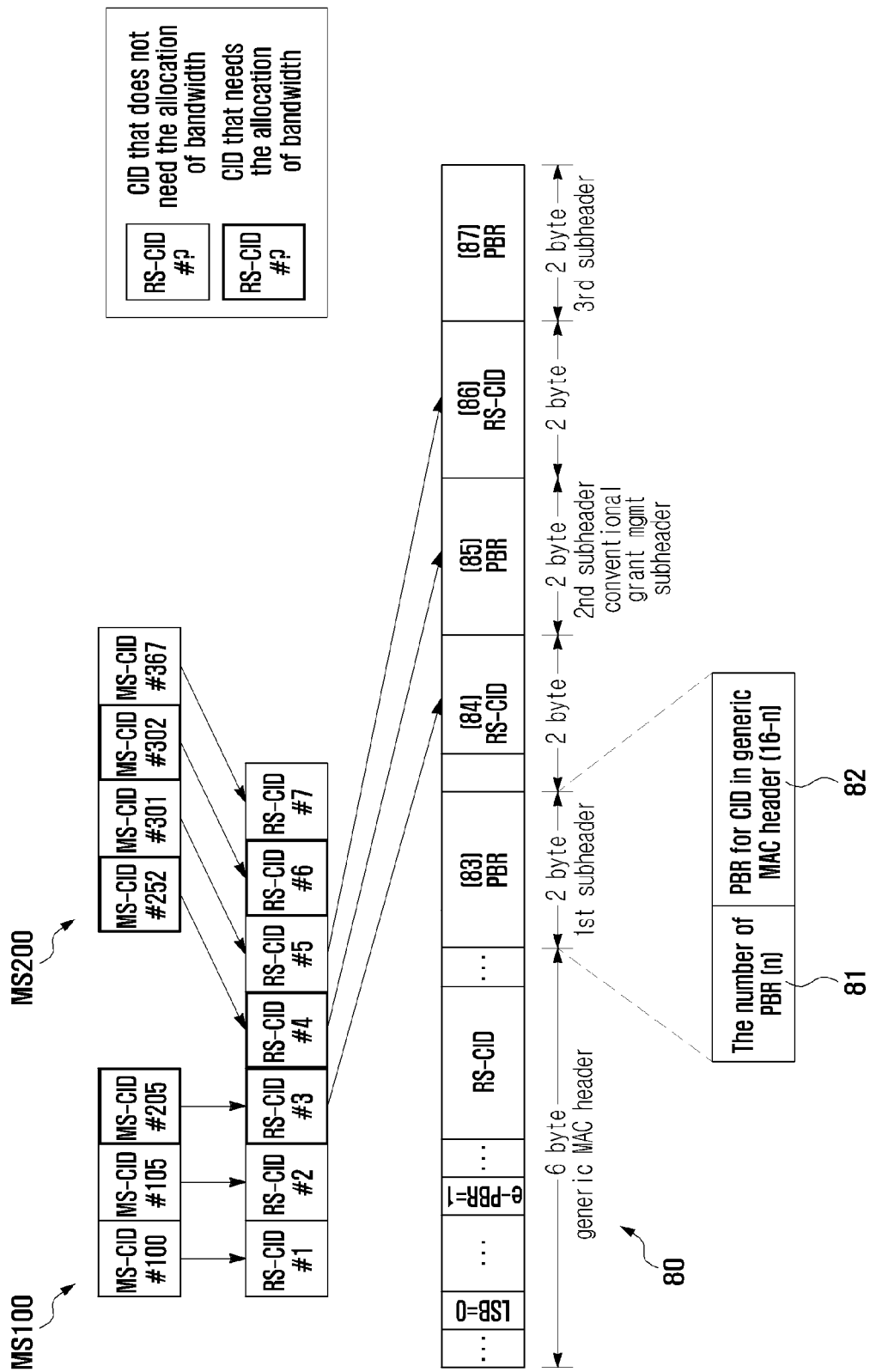
FIG. 8 is a view illustrating a multiple piggyback scheme based on a conventional grant management sub-header in accordance with an exemplary embodiment of the present invention.

Meanwhile, if the total number of CIDs exceeds a specific bit number allocated for distinction of CID (e.g., the number expressible by 5 bits), for example, if forty CIDs should be processed, or if an excessive bit number should be allocated when the aforesaid bitmap is used, the RS 20 may make a message as shown in FIG. 8.

FIG. 8 is a view illustrating a multiple piggyback scheme based on a conventional grant management sub-header in accordance with an exemplary embodiment of the present invention. Namely, FIG. 8 shows a process of making a bandwidth allocation request message regardless of the total number of RS-CIDs or list in the multiple piggyback scheme.

Referring to FIG. 8, the RS 20 performs a mapping between MS-CID and RS-CID. Specifically, MS-CID #100 is mapped to RS-CID #1, MS-CID #105 is mapped to RS-CID #2, and MS-CID #205 is mapped to RS-CID #3. Additionally, MS-CID #252 is mapped to RS-CID #4, MS-CID #301 is mapped to RS-CID #5, MS-CID #302 is mapped to RS-CID #6, and MS-CID #367 is mapped to RS-CID #7. This invention is not limited to the above CID mapping numbers, which may be varied according to a given rule.

Herein, let's suppose that MS-CID #205 of the first MS (MS 100) and MS-CIDs #252 and #302 of the second MS (MS 200) are bandwidth requesting MS-CIDs.

In order to request the allocation of bandwidth, the first and second MSs (MS 100 and MS 200) may use a conventional method for requesting bandwidth to the BS. Then the RS 20 writes the generic MAC header 80 based on CID contained in bandwidth requesting RS-CID #3 and also records bandwidth allocation request information in the first sub-header 83 added to the generic MAC header 80. Here, the first sub-header 83 has a "The number of PBR(n)" region 81 and a "PBR for CID in generic MAC header(16-n)" region 82. The "The number of PBR(n)" region 81 indicates the total number of PBRs requesting the allocation of bandwidth. Here, the size n may be calculated through Equation 1 described earlier. The "PBR for CID in generic MAC header(16-n)" region 82 records bandwidth allocation request information (e.g., bytes of bandwidth) required by RS-CID #3.

Meanwhile, the RS 20 records bandwidth allocation request information corresponding to RS-CID #4 and RS-CID #6 in the second sub-header (i.e., a conventional grant management sub-header) 85 and the third sub-header 87, respectively. In this example, since the second and third sub-headers 85 and 87 record only required bandwidth allocation request information, other sub-headers 84 and 86 with distinguishable CID are added to the existing sub-headers 85 and 87, respectively. Consequently, by setting the LSB bit and the e-PBR bit of the generic MAC header 70 to "0" and "1", respectively, the RS 20 indicates that this message is for a multiple piggyback. Then the RS 20 writes the first sub-header 83 added to the generic MAC header 80, while recording the aforesaid "The number of PBR(n)" region 81 and the aforesaid "PBR for CID in generic MAC header(16-*n*)" region 82.

Additionally, the RS 20 adds a sub-header 84 to the first sub-header 83 to record other bandwidth requiring CID (i.e., RS-CID #4) and then records bandwidth allocation request information required by RS-CID #4 in the second sub-header 85 adjacent to the sub-header 84. Similarly, the RS 20 adds another sub-header 86 to the second sub-header 85 to record CID of RS-CID #6 and then records bandwidth allocation request information required by RS-CID #6 in the third sub-header 87 adjacent to the sub-header 86. Then the RS 20 transmits this message to the BS 30.

The BS 30 receives the message from the RS 20 and checks the LSB bit and the e-PBR bit of the generic MAC header 80. If both bits are set to "0" and "1", respectively, the BS 30 recognizes the received message to be for a multiple piggyback. Additionally, the BS 30 ascertains the total number of PBRs by checking the sub-header 83 added to the generic MAC header 80. In this process, by checking the aforesaid "PBR for CID in generic MAC header(16-*n*)" region 82, the BS 30 can obtain bandwidth allocation request information required by CID contained in the generic MAC header 80. Thereafter, the BS 30 checks the other sub-headers 84, 85, 86 and 87, thereby obtains total CID information and total bandwidth allocation request information required by the RS 20, and then transmits the UL map for the allocation of required bandwidth to the RS 20.

When receiving the UL map from the BS 30, the RS 20 creates an UL-MAP for allocating bandwidth corresponding to CIDs of the first and second MSs (MS 100 and MS 200) and then sends it to each MS. The MS receives the UL-MAP from the RS 20 and, based on allocated bandwidth, transmits data to the BS 30.

As discussed, in several types of multiple piggyback scheme, the RS 20 not only writes a generic MAC header and a sub-header corresponding to bandwidth requiring RS-CID, but also includes a sub-header recording CID information and a conventional grant management sub-header containing bandwidth allocation request information. Therefore, the RS 20 does not need any separate RS-CID list and can make a bandwidth allocation request message by using MS-CID received from the MS as it is.

Described hereinbefore are methods for performing a single piggyback or a multiple piggyback by using a generic MAC header and an adjoining grant management sub-header among methods for requesting the allocation of bandwidth according to embodiments of this invention. Now, among bandwidth allocation request methods according to embodiments of this invention, methods for using a generic MAC header and an extended sub-header that may be defined in the generic MAC header are discussed.

In order to use an extended sub-header, a bandwidth allocation request method of this invention should set an extended sub-header field (ESF) of the generic MAC header to "1". The ESF bit indicates whether an extended sub-header is present or not. Therefore, the RS 20 which plans to use an extended sub-header sets the ESF bit to "1" and adds the extended sub-header to the generic MAC header to be sent to the BS.

Before a discussion of a method using the extended sub-header, a structure of the extended sub-header is described with reference to FIG. 9.

Figure 9:
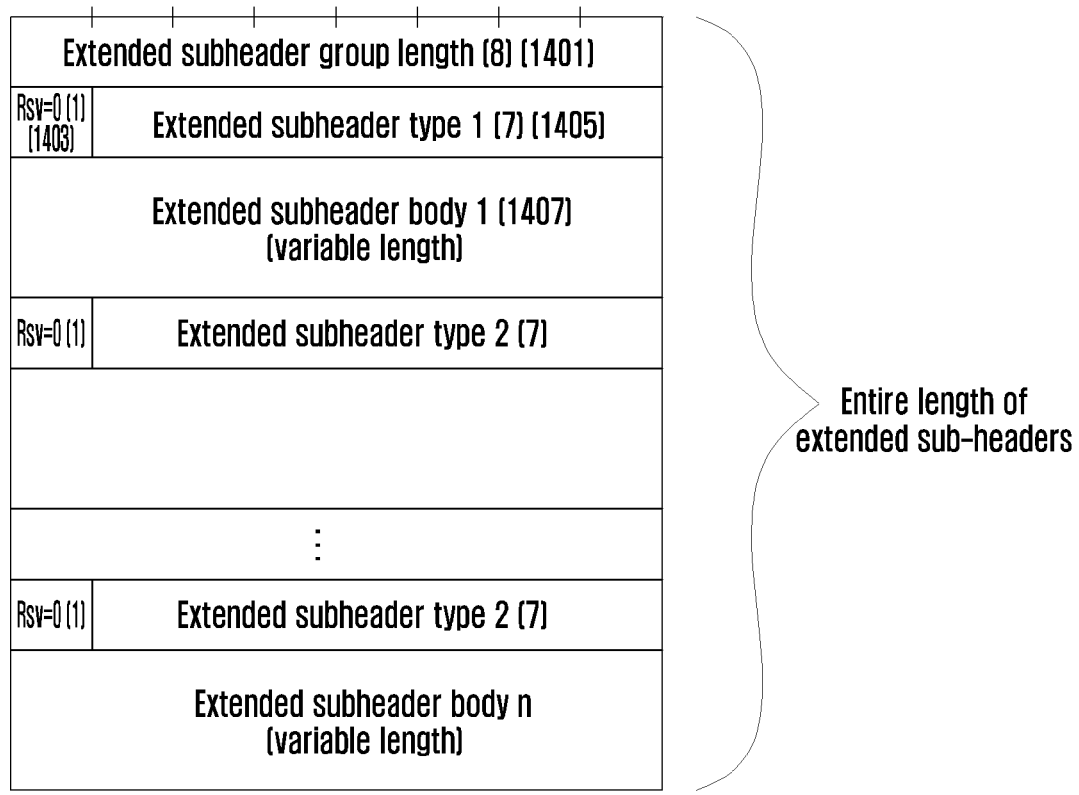
FIG. 9 is a view illustrating a structure of an extended sub-header in accordance with an exemplary embodiment of the present invention.

FIG. 9 is a view illustrating a structure of an extended sub-header in accordance with an exemplary embodiment of the present invention.

Referring to FIG. 9, the extended sub-header includes an extended sub-header group length field 1401, a reserve field 1403, an extended sub-header type 1 field 1405, an extended sub-header body 1 field 1407, etc. Here, the type of extended sub-header may be defined up to 128, depending on a value of the extended sub-header type 1 field 1405. According as a new type of extended sub-header is defined, a corresponding extended sub-header body is also defined.

Namely, when extended sub-headers are added to the generic MAC header to be transmitted, the entire length of extended sub-headers is first indicated and then any other necessary extended sub-headers are added in order by referring to Tables 4 and 5 given below. These extended sub-headers may be distinguished depending on a value of each extended sub-header type field 1405 of the UL and the DL. Table 4 shows the types of extended sub-header distinguished according to a value of the extended sub-header type field 1405 in the UL.

TABLE 4

| Extended sub-header type | Name | Extended sub-header body size (byte) |
|---|---|---|
| 0 | SDU_SN extended sub-header | 1 |
| 1 | DL sleep control extended sub-header | 3 |
| 2 | Feedback request extended sub-header | 3 |
| 3 | SN request extended sub-header | 1 |
| 4 | PDU SN (short) extended sub-header | 1 |
| 5 | PDU SN (long) extended sub-header | 2 |
| 6-127 | Reserved | — |

Table 5 shows the types of extended sub-header distinguished according to a value of the extended sub-header type field 1405 in the DL.

TABLE 5

| Extended sub-header type | Name | Extended sub-header body size (byte) |
|---|---|---|
| 0 | MIMO mode feedback extended sub-header | 1 |
| 1 | UL Tx power report extended sub-header | 1 |
| 2 | Mini-feedback extended sub-header | 2 |
| 3 | PDU SN (short) extended sub-header | 1 |
| 4 | PDU SN (long) extended sub-header | 2 |
| 5-127 | Reserved | — |

Therefore, this invention proposes a method for requesting the allocation of bandwidth through a single or multiple piggyback scheme by using a reserved region in case where a value of the extended sub-header type field 1405 in the UL is 6 to 127 and in case where a value of the extended sub-header type field 1405 in the DL is 5 to 127.

Hereinafter, a value "A" of the extended sub-header type field 1405 is defined as case where the RS requests the allocation of bandwidth by performing a single piggyback scheme using both an RS-CID list and an extended sub-header. A value "B" of the extended sub-header type field 1405 is defined as another case where the RS requests the allocation of bandwidth by performing a single piggyback scheme using both an extended sub-header and a conventional grant management sub-header. A value "C" of the extended sub-header type field 1405 is defined as still another case where the RS requests bandwidth allocation based on a multiple piggyback scheme using both an extended sub-header and order information of an RS-CID list. A value "D" of the extended sub-header type field 1405 is defined as yet another case where the RS requests bandwidth allocation through a multiple piggyback scheme using both an extended sub-header and a bitmap created from respective RS-CIDs corresponding to an RS-CID list. A value "E" of the extended sub-header type field 1405 is defined as yet another case where the RS requests bandwidth allocation based on a multiple piggyback scheme using both an extended sub-header and other sub-headers for recording CID information corresponding to each of several RS-CIDs. These values A, B, C, D and E are exemplary only, and any other suitable values of the extended sub-header type field 1405 shown in Tables 4 and 5 (i.e., from 6 to 127 in case of UL and from 5 to 127 in case of DL) may be alternatively used.

Figure 10:
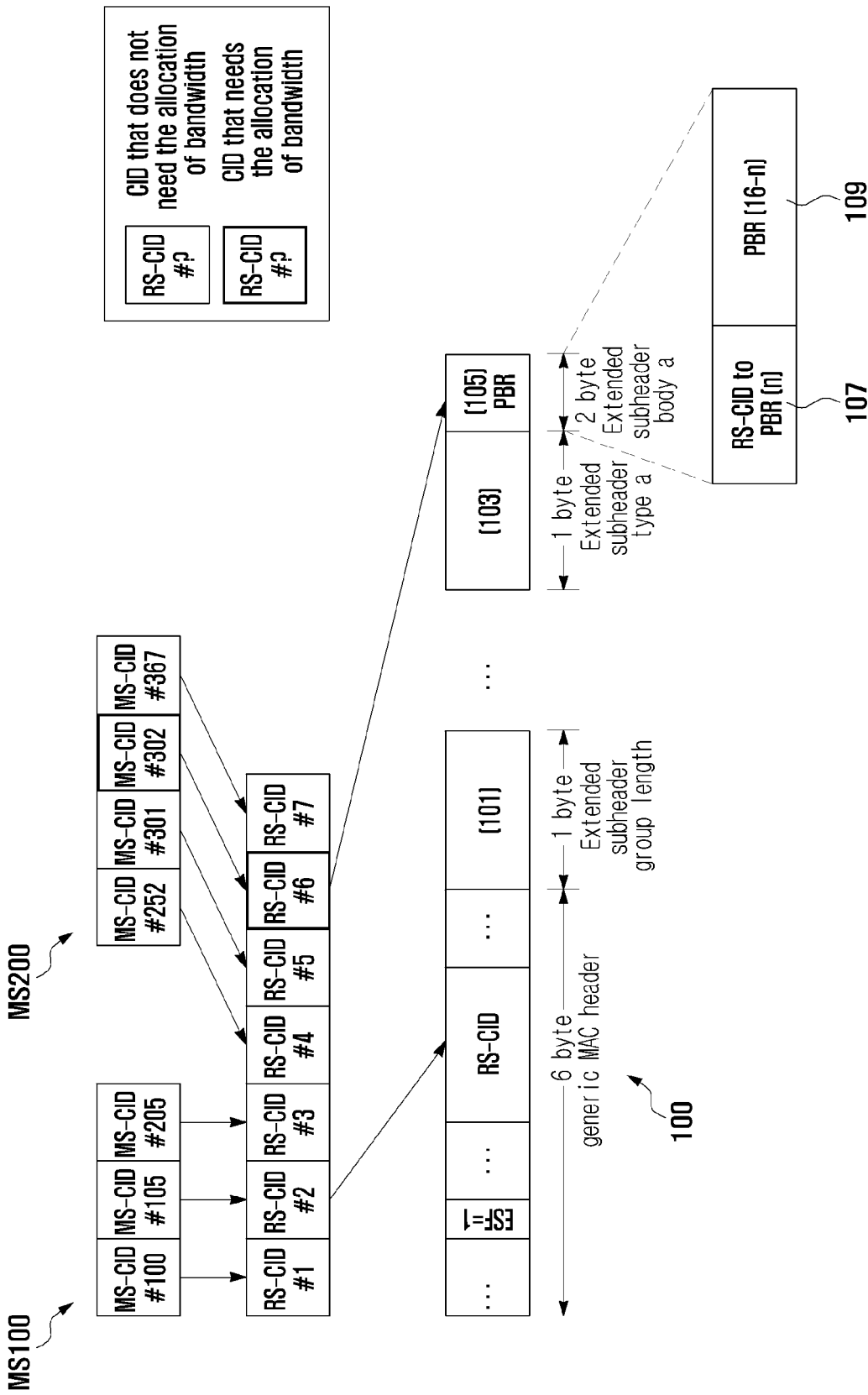
FIG. 10 is a view illustrating a single piggyback scheme based on an RS-CID list and an extended sub-header in accordance with an exemplary embodiment of the present invention.

FIG. 10 is a view illustrating a single piggyback scheme based on an RS-CID list and an extended sub-header in accordance with an exemplary embodiment of the present invention.

Referring to FIG. 10, in this single piggyback scheme using the extended sub-header of this invention, the RS 20 performs a mapping between each MS-CID of the first MS (MS 100) and its own RS-CID and between each MS-CID of the second MS (MS 200) and its own RS-CID. For instance, the RS 20 may perform a mapping to connect RS-CID #1, RS-CID #2 and RS-CID #3 to MS-CIDs of the first MS (MS 100), respectively, and also to connect RS-CID #4, RS-CID #5, RS-CID #6 and RS-CID #7 to MS-CIDs of the second MS (MS 200), respectively. This mapping process depends on a predefined CID matching form, and this invention is not limited to the above CID numbers.

Herein, let's suppose that RS-CID #2 corresponding to MS-CID #105 is contained in a message transmitted to the BS 30, and that MS-CID #302 of the second MS (MS 200) is a bandwidth requesting CID. Then, since each of the first and second MSs (MS 100 and MS 200) records CID information, bandwidth allocation request information and related field values in MS-CID in order to request the allocation of bandwidth, the RS 20 can ascertain whether the MS-CID is for a bandwidth allocation request or not by checking the above information and field values. Therefore, in the above mapping process, the RS 20 can ascertain whether there is MS-CID having the contents for a bandwidth allocation request in MS-CIDs of the first and second MSs (MS 100 and MS 200). Namely, the RS 20 can know that bandwidth requesting CIDs are RS-CID #3, RS-CID #4 and RS-CID #6 in an RS-CID list.

After an RS-CID mapping is completed, the RS 20 arranges RS-CIDs according to a given rule and then makes an RS-CID list corresponding to the arranged RS-CIDs. In this case, the RS 20 makes a generic MAC header 100 containing RS-CID #2 and also sets the ESF field of the generic MAC header 100 to "1". Also, the RS 20 adds an extended sub-header group length field 101, an extended sub-header, an extended sub-header type A 103, and an extended sub-header body A 105 to the generic MAC header 100. Here, the extended sub-header body A 105 has an "RS-CID to PBR(n)" region 107 and a "PBR(16-n)" region 109. The RS-CID to PBR(n) region 107 contains rank information about bandwidth requesting RS-CID in the RS-CID list, and the PBR(16-n) region 109 contains bandwidth allocation request information required by the bandwidth requesting RS-CID. The RS 20 adds this message to the extended sub-header type A 103 and then transmits it to the BS 30. Here, the size n of the "RS-CID to PBR" field may be obtained through the aforesaid Equation 1.

Meanwhile, the BS 30 receives the message from the RS 20 and checks the ESF field to determine whether there is an extended sub-header. If the ESF is set to "1", the BS 30 can know the type of a bandwidth allocation request message by checking the extended sub-header type. Namely, in case of the extended sub-header type A, the BS 30 can know which CID in the RS-CID list requires bandwidth recorded in the PBR(16-n) region 109, and thereby allocates corresponding bandwidth to the RS 20. Then the RS 20 allocates the above bandwidth to the MS.

Meanwhile, if the number of CIDs in the RS-CID list is greater than a certain number expressible by the size of the RS-CID to PBR field, the RS 20 cannot perform a proper distinction of CIDs. For instance, if the size of the RS-CID to PBR field is "5", the RS 20 can distinguish up to total 32 CIDs but cannot distinguish CIDs more than 32. Therefore, the RS 20 supports a proper bandwidth allocation request using a data structure as shown in FIG. 11.

Figure 11:
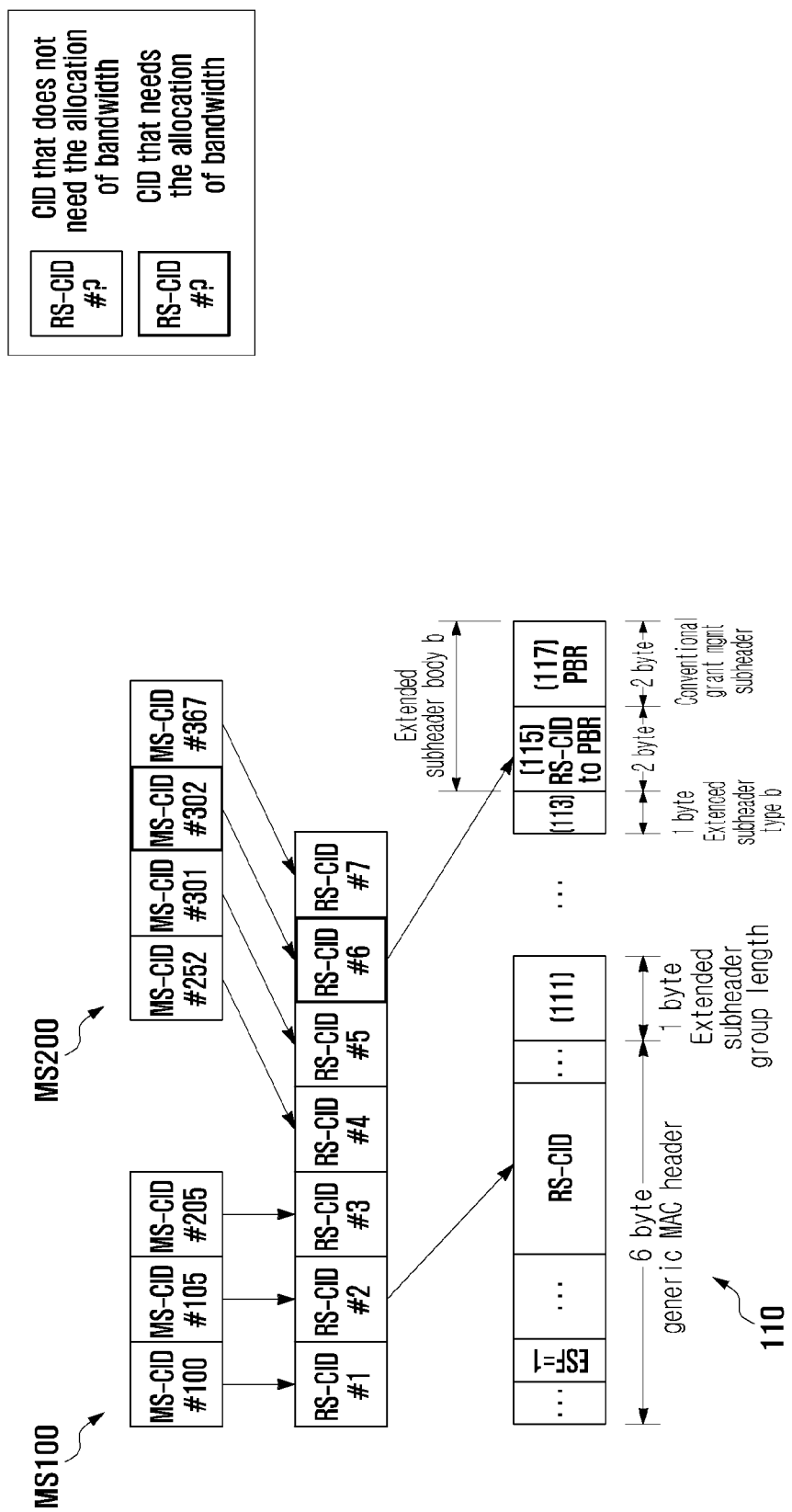
FIG. 11 is a view illustrating a single piggyback scheme using a conventional grant management sub-header and an extended sub-header in accordance with an exemplary embodiment of the present invention.

FIG. 11 is a view illustrating a single piggyback scheme using a conventional grant management sub-header and an extended sub-header in accordance with an exemplary embodiment of the present invention. Namely, FIG. 11 shows a method for requesting the allocation of bandwidth for CID of the generic MAC header and for other CIDs by using the extended sub-header in a single piggyback scheme using a conventional grant management sub-header.

Herein, let's suppose that MS-CIDs of the first MS (MS 100) are mapped to RS-CID #1, RS-CID #2 and RS-CID #3, and MS-CIDs of the second MS (MS 200) are mapped to RS-CID #4, RS-CID #5, RS-CID #6 and RS-CID #7. Additionally, let's suppose that RS-CID #6 is bandwidth requesting CID.

Referring to FIG. 11, the RS 20 writes a generic MAC header 110 containing RS-CID #2 and also sets the ESF field of the generic MAC header 110 to "1". Also, the RS 20 adds an extended sub-header group length field 111, an extended sub-header, an extended sub-header type B 113, and an extended sub-header body B to the generic MAC header 110. Here, the extended sub-header body B has a sub-header for recording RS-CID to PBR 115 and a conventional grant management sub-header 117. Namely, for a bandwidth allocation request for RS-CID #6, the RS 20 uses the conventional grant management sub-header 117 as discussed earlier in Table 1. Here, since the conventional grant management sub-header 117 contains only bandwidth information required for RS-CID #6, the RS 20 transmits RS-CID #6 information, namely the 2-byte sub-header 115 containing "RS-CID to PBR", together with the conventional grant management sub-header 117.

Namely, the RS 20 adds the extended sub-header group length field 111 with a fixed size (e.g., 1 byte) to the generic MAC header 110 containing RS-CID #2 information, further adds the extended sub-header type B 113 with 1-byte size, the sub-header 115 containing "RS-CID to PBR" as information about bandwidth requesting RS-CID, and the conventional grant management sub-header 117, and then transmits it to the BS 30.

Meanwhile, the BS 30 that receives the aforesaid message from the RS 20 checks the ESF field of the generic MAC header 110. If the ESF field is set to "1", the BS 30 can know that the received message is for a single piggyback using the extended header. Then the BS 30 detects CID information corresponding to bandwidth requiring RS-CID #6 from the sub-header 115, further detects bandwidth required by RS-CID #6 through the conventional grant management sub-header 117, and allocates the detected bandwidth to the RS 20.

Here, the RS 20 may not need to make a separate RS-CID list when writing bandwidth information about bandwidth requesting RS-CID by using the conventional grant management sub-header 117 and also writing CID information about RS-CID #6 by using the sub-header 115. Additionally, even though using MS-CID itself instead of using RS-CID to which MS-CID is mapped, the RS 20 may transmit a message for requesting the same bandwidth.

As discussed, in a single piggyback scheme using the extended sub-header of this invention, the method for requesting the allocation of bandwidth defines the ESF field of the generic MAC header transmitted to the BS 30 and thereby indicates that the current generic MAC header contains a bandwidth allocation request message. Also, this method can minimize CID-related information for a bandwidth allocation request when using the extended sub-header, thus minimizing a load caused by message transmission for a bandwidth allocation request. Additionally, this method can be performed regardless of polling cycle of the BS 30 for a check of the need for bandwidth, thus minimizing an unnecessary time delay.

Next, a bandwidth allocation request method based on a multiple piggyback scheme using an extended sub-header of this invention is described.

Figure 12:
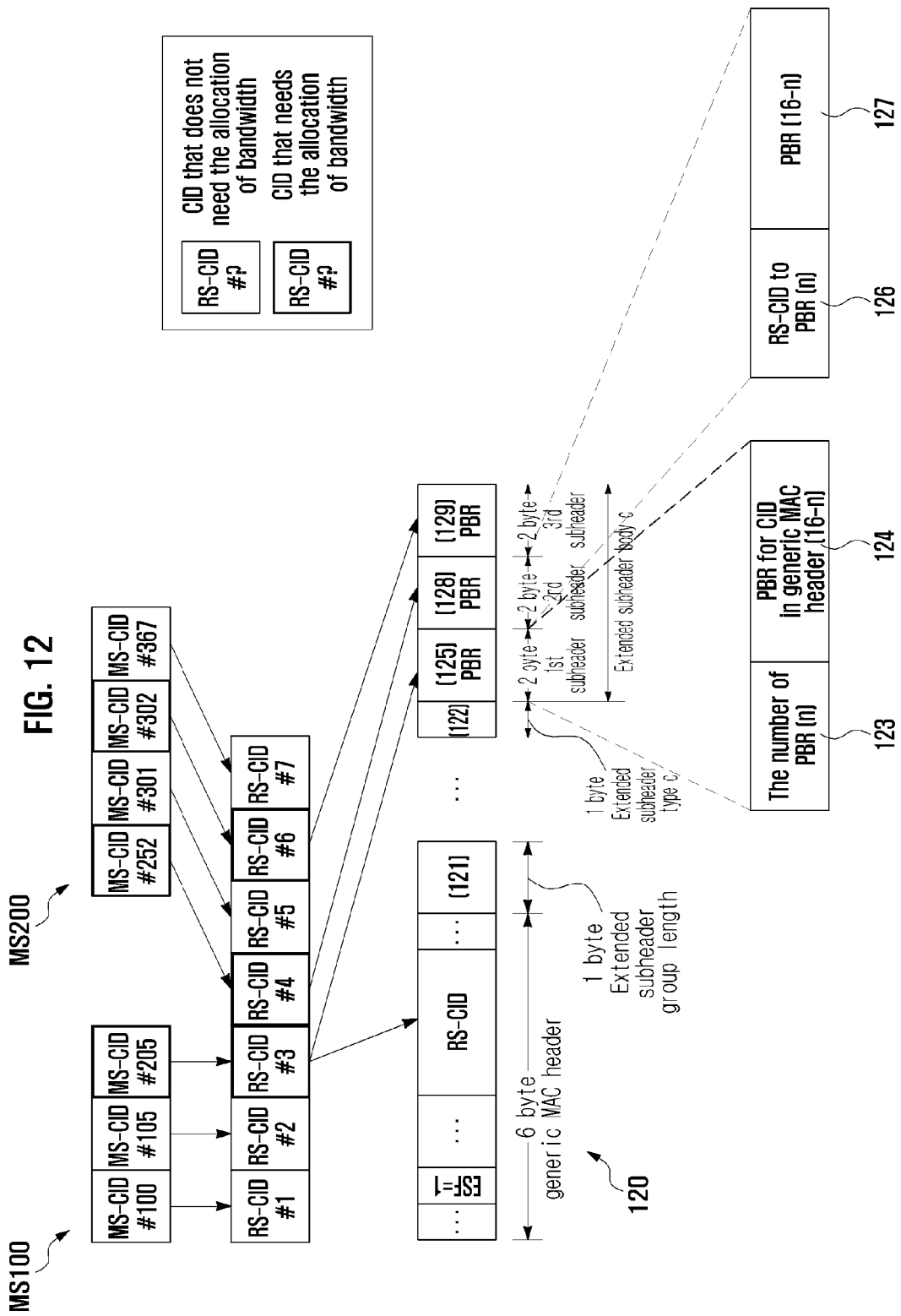
FIG. 12 is a view illustrating a multiple piggyback scheme based on an RS-CID list and an extended sub-header in accordance with an exemplary embodiment of the present invention.

FIG. 12 is a view illustrating a multiple piggyback scheme based on an RS-CID list and an extended sub-header in accordance with an exemplary embodiment of the present invention.

Referring to FIG. 12, the RS 20 performs a mapping so that MS-CID #100, MS-CID #105 and MS-CID #205 of the first MS (MS 100) and MS-CID #252, MS-CID #301, MS-CID #302 and MS-CID #367 of the second MS (MS 200) may be mapped to its own prearranged RS-CIDs according to a given rule.

After an RS-CID mapping is completed, the RS 20 makes a bandwidth allocation request message, as shown, based on an RS-CID list that contains RS-CID #3, RS-CID #4 and RS-CID #6 corresponding to the respective bandwidth requesting MS-CIDs. Specifically, the RS 20 extracts RS-CID information from RS-CID #3 and writes it in the CID field of the generic MAC header 120. Here, by setting the ESF field of the message to "1", the RS 20 may indicate that the message is to request the allocation of bandwidth for specific CID by using the extended sub-header. After writing CID information of RS-CID #3 in the CID field of the generic MAC header 120, the RS 20 writes an extended sub-header group length field 121 added to the generic MAC header 120. Then the RS 20 writes an extended sub-header type C 122 with 1-byte size for indicating that the message arranges CID information in order of the RS-CID list, and writes an extended sub-header body C added to the extended sub-header type C 122. Here, the extended sub-header body C may include the first sub-header 125, the second sub-header 128 and the third sub-header 129.

The first sub-header 125 has a "The number of PBR(n)" region 123 and a "PBR for CID in generic MAC header(16-n)" region 124. The "The number of PBR(n)" region 123 indicates the total number of PBRs requesting the allocation of bandwidth. Here, the size n may be calculated through Equation 1 described earlier. The "PBR for CID in generic MAC header(16-n)" region 124 records bandwidth information (e.g., bytes of bandwidth) required by RS-CID #3.

Each of the second and third sub-headers 128 and 129 has an "RS-CID to PBR(n)" region 126 and a "PBR(16-n)" region 127. The "RS-CID to PBR(n)" region of the second sub-header 128 may record information (i.e., "4") about the location of RS-CID #4 in the RS-CID list, and the "RS-CID to PBR(n)" region of the third sub-header 129 may record information (i.e., "6") about the location of RS-CID #6 in the RS-CID list. Additionally, the "PBR(16-n)" region of the second sub-header 128 records bandwidth allocation request information required by RS-CID #4, and the "PBR(16-n)" region of the third sub-header 129 records bandwidth allocation request information required by RS-CID #6.

Then the RS 20 transmits to the BS 30 the above message including the ESF field set to "1", the generic MAC header 120 containing CID of RS-CID #3, the extended sub-header group length field 121, the field indicating the extended sub-header type C 122, and the extended sub-header body C added to the extended sub-header type C 122.

Then the BS 30 receives the above message and, by checking the ESF bit of the generic MAC header 120, recognizes the received message to be a multiple piggyback message using the extended sub-header. Additionally, the BS 30 can know the type of a bandwidth request by checking the extended sub-header type. Also, the BS 30 can know how many CIDs request the allocation of bandwidth by checking the first sub-header 125, and can know bandwidth request information through the first, second and third sub-headers 125, 128 and 129. Then the BS 30 offers a corresponding bandwidth allocation map (e.g., the UL map) to the RS 20.

When receiving the UL map from the BS 30, the RS 20 checks available bandwidth regions from the UL map and, based thereon, allocates bandwidth requested by each MS-CID. Then MS recognizes bandwidth allocation for corresponding MS-CID from the RS 20 and may perform data transmission through the allocated bandwidth.

Here, the length of the extended sub-header body C may be varied according to the total number of bandwidth requesting RS-CIDs. Since the length of the sub-header for a bandwidth allocation request of each bandwidth requesting RS-CID is 2 bytes, the length of the extended sub-header body C equals the total number (three) of bandwidth requesting RS-CIDs multiplied by the length (2 bytes) of the sub-header for a bandwidth request. Namely, the length of the extended sub-header body C becomes twice a value recorded in a "The number of PBR" field contained in the first sub-header. Additionally, the RS 20 may replace a "The order of CID to PBR" field of the second and third sub-headers 128 and 129 with an individual CID index.

As discussed, in case of receiving several bandwidth requesting MS-CIDs from at least one MS, the RS 20 creates the RS-CID list based on all MS-CIDs received from the MS, and also fixes the order of respective bandwidth requesting RS-CIDs. Then the RS 20 records a plan to use the extended sub-header in the generic MAC header for specific RS-CID to be transmitted to the BS 30, sets the extended sub-header type C region, and adds a grant management sub-header for a bandwidth allocation request for each CID while using an index value of each CID as the sequence number of each CID. Therefore, the RS 20 can minimize the size of a bandwidth allocation request message through a process of adding a 2-byte grant management sub-header for each bandwidth requesting CID, thus allowing an integrated management of several bandwidth requesting CIDs.

Meanwhile, the RS 20 may support a quick distinction of bandwidth requesting RS-CIDs by mapping all CIDs to certain bitmaps. For this, the RS 20 may make a message as shown in FIG. 13.

Figure 13:
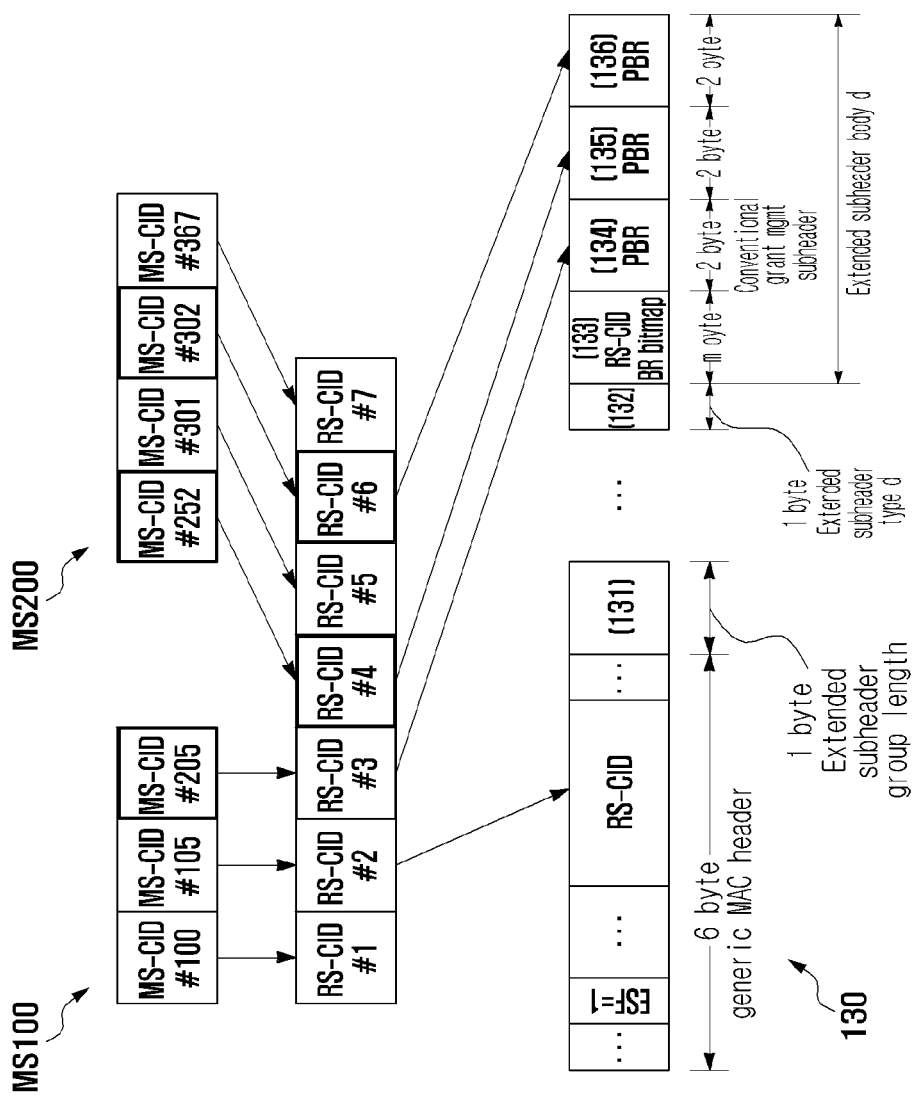
FIG. 13 is a view illustrating a multiple piggyback scheme based on a bitmap and extended sub-header in accordance with an exemplary embodiment of the present invention.

FIG. 13 is a view illustrating a multiple piggyback scheme based on a bitmap and extended sub-header in accordance with an exemplary embodiment of the present invention. Namely, FIG. 13 shows a process of making a bandwidth allocation request message by mapping all RS-CIDs to bitmaps in the multiple piggyback scheme.

Referring to FIG. 13, the RS 20 creates an RS-CID list by arranging MS-CIDs of the first and second MSs (MS 100 and MS 200) according to a given rule. Herein, let's suppose that MS-CID #205 of the first MS (MS 100) and MS-CIDs #252 and #302 of the second MS (MS 200) are bandwidth requesting MS-CIDs.

Then the RS 20 performs a mapping to connect MS-CID #100, MS-CID #105, MS-CID #205, MS-CID #252, MS-CID #301, MS-CID #302 and MS-CID #367 to its own RS-CIDs, respectively, according to a given rule.

In the above mapping process, the RS 20 checks whether there is any MS-CID having the contents for a bandwidth allocation request in MS-CIDs of the first and second MSs (MS 100 and MS 200). Since each of the first and second MSs (MS 100 and MS 200) records CID information, bandwidth allocation request information and related field values in MS-CID in order to request the allocation of bandwidth, the RS 20 can ascertain whether the MS-CID is for a bandwidth allocation request or not by checking the above information and field values. Therefore, the RS 20 can know that bandwidth requesting CIDs are RS-CID #3, RS-CID #4 and RS-CID #6 in an RS-CID list.

Here, the RS 20 allocates "0" to RS-CID that does not request bandwidth allocation, and allocates "1" to RS-CID that requests bandwidth allocation. Consequently, RS-CID #3, RS-CID #4 and RS-CID #6 that are bandwidth requesting CIDs are assigned "1" and the other RS-CIDs are assigned "0". Therefore, in case of this example, the RS 20 may create a bitmap "0011010" corresponding to the entire RS-CID list.

After the above bitmap creation process is completed, the RS 20 writes a generic MAC header 130 for specific RS-CID (e.g. RS-CID #2) to be transmitted to the BS 30 and also sets the ESF field of the generic MAC header 130 to "1" to indicate that the bitmap and bandwidth allocation request information will use the extended sub-header. Then the RS 20 writes a field for indicating an extended sub-header group length field 131 added to the generic MAC header 130, and also writes an extended sub-header type D 132 for indicating that the message is a multiple piggyback scheme based on the extended sub-header and the bitmap. Additionally, the RS 20 writes an extended sub-header body D added to the extended sub-header type D 132. Here, the extended sub-header body D records bitmap information and bandwidth allocation request information corresponding to CID of each bandwidth requesting RS-CID. Namely, the extended sub-header body D includes a sub-header 133 that records "RS-CID BR bitmap", and also includes conventional grant management sub-headers 134, 135 and 136 that are added to the sub-header 133 and record bandwidth allocation request information for each bandwidth requesting CID. Namely, the extended sub-header body D includes the first conventional grant management sub-header 134 containing bandwidth allocation request information about RS-CID #3, the second conventional grant management sub-header 135 containing bandwidth allocation request information about RS-CID #4, and the third conventional grant management sub-header 136 containing bandwidth allocation request information about RS-CID #6.

Therefore, the RS 20 transmits to the BS 30 a message that contains the generic MAC header 130, the extended sub-header group length field 131, the extended sub-header type D 132, the sub-header 133 having RS-CID BR bitmap, and the conventional grant management sub-headers 134, 135 and 136 having bandwidth allocation request information detected from RS-CID #3, RS-CID #4 and RS-CID #6.

Here, the RS 20 may fix RS-CID BR bitmap to a specific bit or may apply flexibly it. In case where the RS 20 fixes the size of RS-CID BR bitmap, for example, to 2 bytes, the total number of RS-CIDs processed by the RS 20 does not exceed 16. Also, in case of 2-byte bitmap, the RS 20 may assign the aforesaid bitmap "0011010" to former 7 bits and assign "0" to the other bits. Therefore, the entire bitmap may become "0011010000000000".

If the ESF field of the generic MAC header 130 received from the RS 20 is set to "1", the BS 30 recognizes the received message to be for a multiple piggyback using the extended sub-header and, by checking the extended sub-header type D 132 region, can know that this message is for a multiple piggyback using bitmap. Then the BS 30 can know which RS-CID requires bandwidth allocation by checking bitmap, and also can know the amount of bandwidth actually required by the RS-CID by checking the first to third conventional grant management sub-headers 134, 135 and 1376 added to the sub-header 133. In this process, the BS 30 makes an UL map for the allocation of required bandwidth by matching the order of conventional sub-headers and CID of RS-CID requiring bandwidth allocation, and then sends the UL map to the RS 20.

When receiving the UL map from the BS 30, the RS 20 controls proper bandwidth allocation, based on the received UL map, for MS-CID of each MS that requires bandwidth allocation.

As discussed, in case where the total number of RS-CIDs is expressible with a certain bitmap, the bandwidth allocation request method using bitmap among a multiple piggy-back scheme using an extended sub-header may quickly make and recognize an index for distinction of RS-CIDs requiring bandwidth allocation, and may write bandwidth allocation request information in a conventional grant management sub-header to thereby support the allocation of required bandwidth.

Figure 14:
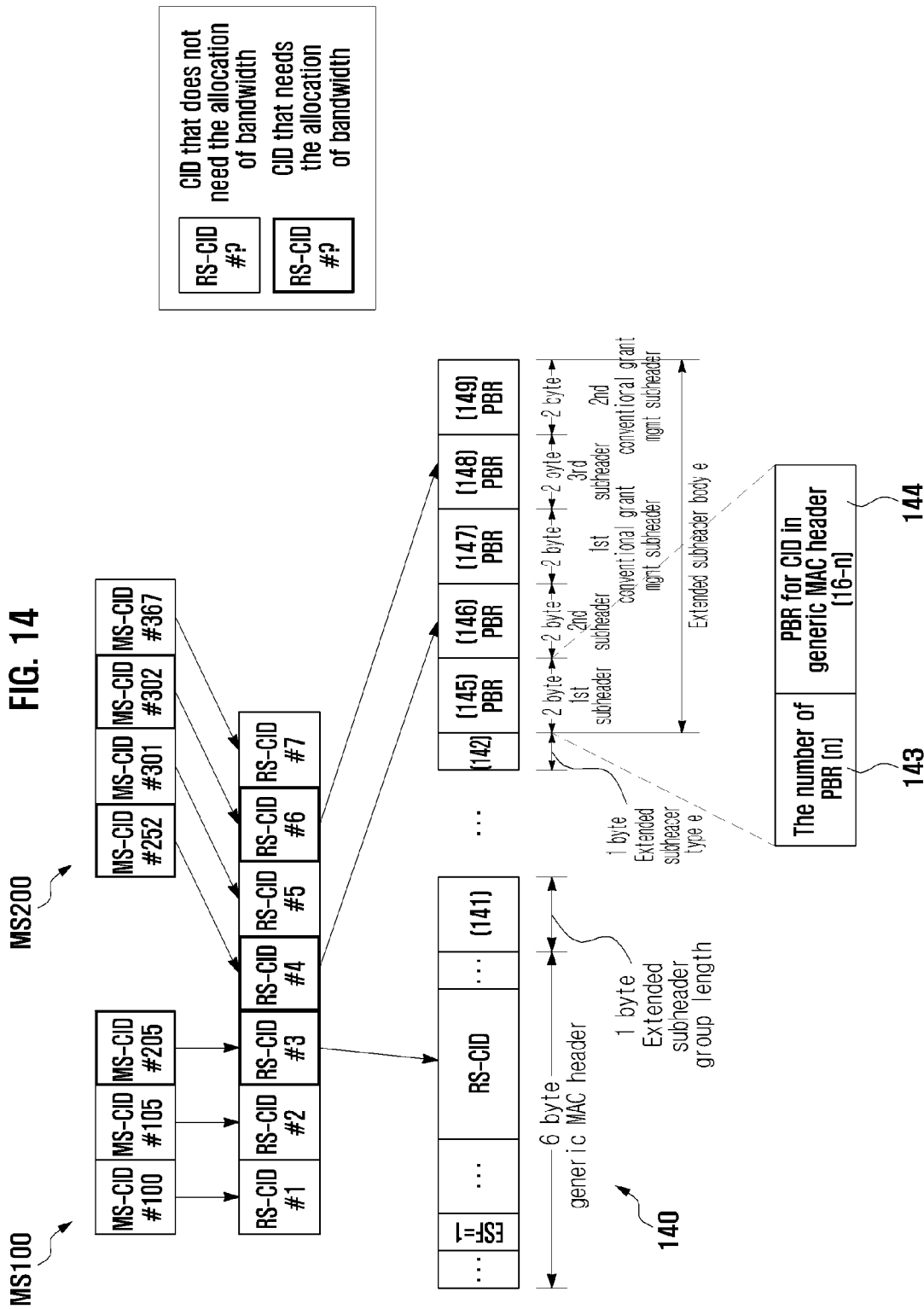
FIG. 14 is a view illustrating a multiple piggyback scheme based on plural conventional grant management sub-headers and an extended sub-header in accordance with an exemplary embodiment of the present invention.

Meanwhile, if the total number of CIDs exceeds a specific bit number allocated for distinction of CID (e.g., the number expressible by 5 bits), for example, if forty CIDs should be processed, or if a bit number excessive for the allocation of bitmap is used, the RS 20 may make a message as shown in FIG. 14.

FIG. 14 is a view illustrating a multiple piggyback scheme based on plural conventional grant management sub-headers and an extended sub-header in accordance with an exemplary embodiment of the present invention. Namely, FIG. 14 shows a process of making a bandwidth allocation request message regardless of the total number of RS-CIDs or list in the multiple piggyback scheme.

Herein, as supposed in FIG. 10, let's suppose that MS-CIDs of the first MS (MS 100) are mapped to RS-CID #1, RS-CID #2 and RS-CID #3, and MS-CIDs of the second MS (MS 200) are mapped to RS-CID #4, RS-CID #5, RS-CID #6 and RS-CID #7. Additionally, let's suppose that RS-CID #6 is bandwidth requesting CID.

Referring to FIG. 14, the RS 20 writes a generic MAC header 140 based on CID contained in bandwidth requesting RS-CID #3 and also sets the ESF field of the generic MAC header 140 to "1". Then the RS 20 writes an extended sub-header group length field 141 added to the generic MAC header 140. Thereafter, the RS 20 writes an extended sub-header type E 142 for indicating that the message is a type using several conventional grant management sub-headers among a multiple piggyback scheme based on the extended sub-header. Additionally, the RS 20 defines an extended sub-header body E region that is added to the extended sub-header type E 142 and contains CID information about bandwidth requesting RS-CIDs and bandwidth allocation request information.

Here, the extended sub-header body E region may include the first sub-header 145 proposed by this invention, and two conventional grant management sub-headers, namely the second and third conventional grant management sub-headers 147 and 149. The first sub-header 145 has a "The number of PBR(n)" region 143 and a "PBR for CID in generic MAC header(16-n)" region 144. The "The number of PBR(n)" region 143 indicates the total number of PBRs requesting the allocation of bandwidth. Here, the size n may be calculated through Equation 1 described earlier. The "PBR for CID in generic MAC header(16-n)" region 145 records bandwidth allocation request information (e.g., bytes of bandwidth) required by RS-CID #3.

Meanwhile, the RS 20 records bandwidth allocation request information corresponding to RS-CID #4 and RS-CID #6 in the second and third conventional grant management sub-headers 147 and 149, respectively. In this example, since the second and third conventional grant management sub-headers 147 and 149 record only required bandwidth allocation request information, other second and third sub-headers 146 and 148 with distinguishable CID are added to the second and third conventional grant management sub-headers 147 and 149, respectively.

Namely, after setting the ESF field of the generic MAC header 140 to "1", the RS 20 makes a message that contains the generic MAC header 140, the extended sub-header group length filed 141, the extended sub-header type E region 142 and the extended sub-header body E, and then transmits it to the BS 30.

The BS 30 receives from the RS 20 the message in which the ESF field of the generic MAC header 140 is "1", and checks the extended sub-header type. If the extended sub-header type is "E", the BS 30 recognizes the received message to be for a multiple piggyback using several conventional grant management sub-headers. Therefore, the BS 30 ascertains the total number of PBRs by checking the first sub-header 145 and in this process, by checking the "PBR for CID in generic MAC header(16-n)" region 144, can obtain bandwidth allocation request information required by CID contained in the generic MAC header 140. Thereafter, the BS 30 checks the second sub-header 146, the second conventional grant management sub-header 147, the third sub-header 148 and the third conventional grant management sub-header 149, thereby obtains total CID information and total bandwidth allocation request information required by the RS 20, and then transmits the UL map for the allocation of required bandwidth to the RS 20.

When receiving the UL map from the BS 30, the RS 20 creates an UL-MAP for allocating bandwidth corresponding to MS-CID of each MS and then sends it to each MS. The MS receives the UL-MAP from the RS 20 and, based on allocated bandwidth, transmits data to the BS 30.

As discussed, in several types of multiple piggyback scheme using an extended sub-header, the RS 20 not only writes a generic MAC header and a grant management sub-header corresponding to bandwidth requiring RS-CID, but also includes a sub-header that records CID information and a conventional grant management sub-header that contains bandwidth allocation request information. Therefore, the RS 20 does not need any separate RS-CID list and can make a bandwidth allocation request message by using MS-CID received from the MS as it is.

Described hereinbefore are methods for performing a single piggyback or a multiple piggyback by using a grant management sub-header or by using a grant management sub-header based on an extended sub-header among methods for requesting the allocation of bandwidth according to embodiments of this invention. Now, methods for allocating bandwidth at the RS and at the BS are discussed with reference to the drawings.

Figure 15:
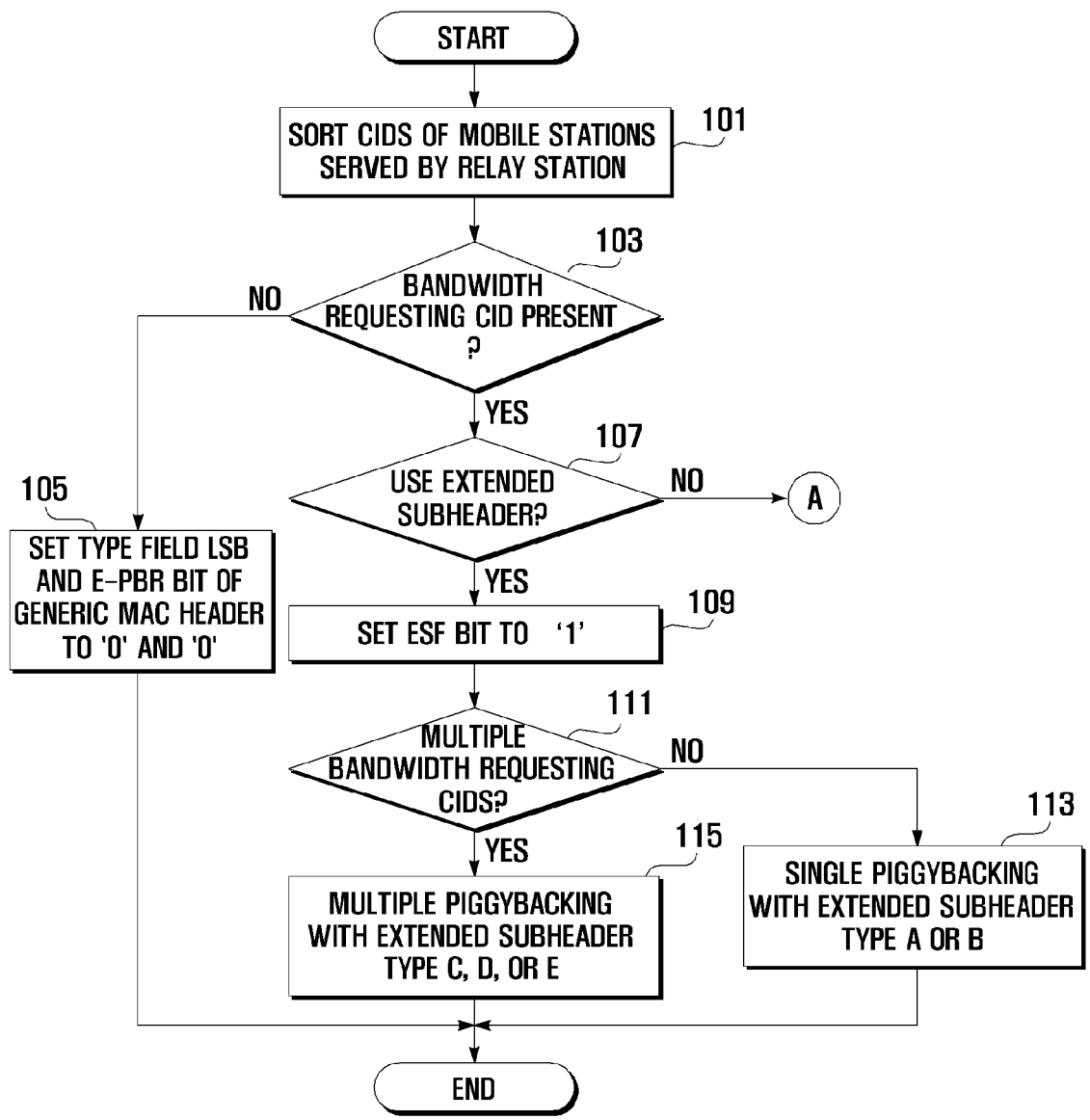
FIGS. 15 and 16 are flow diagrams illustrating a method for requesting the allocation of bandwidth at a relay station in accordance with an exemplary embodiment of the present invention.
Figure 16:
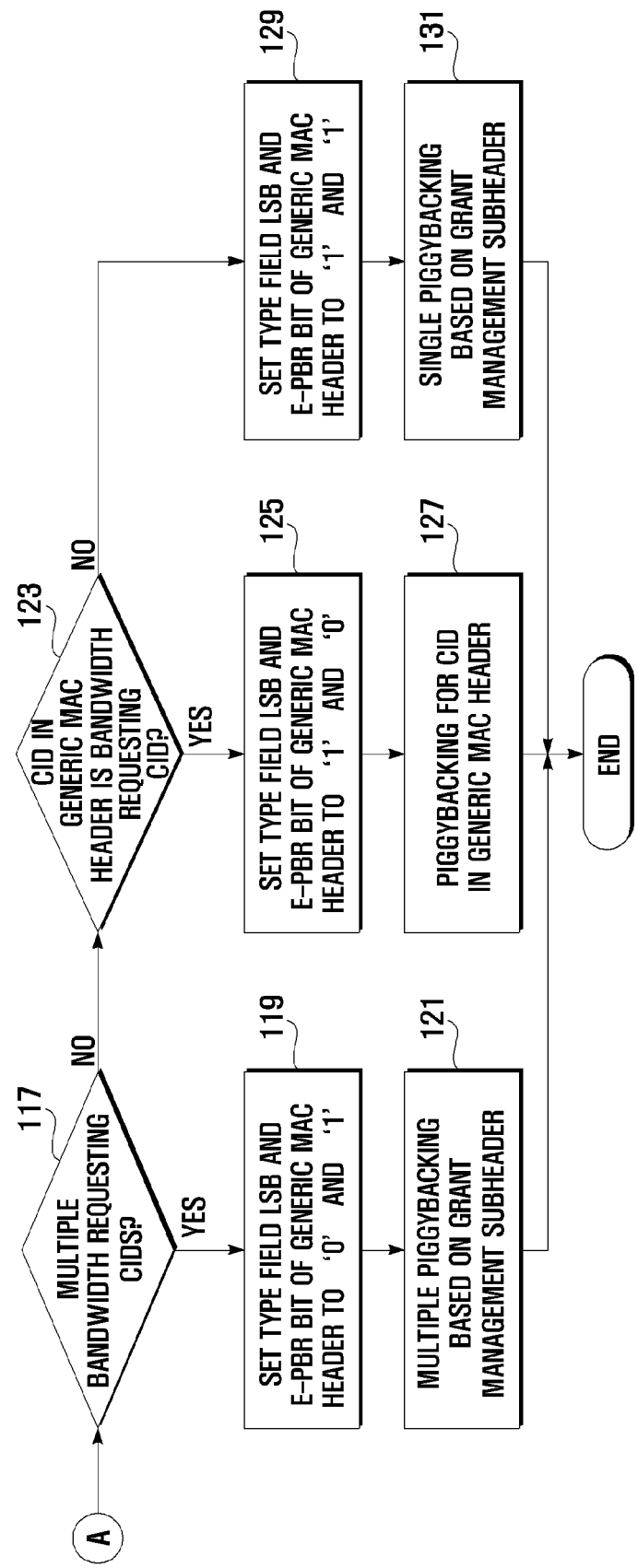

FIGS. 15 and 16 are flow diagrams illustrating a method for requesting the allocation of bandwidth at a relay station in accordance with an exemplary embodiment of the present invention.

Referring to FIGS. 15 and 16, in step 101, the RS establishes RS-CIDs mapped to MS-CIDs of the MSs that belong to its coverage, arranges CID of the MSs being in communication therewith, and the makes an RS-CID list based on the established RS-CIDs.

Next, in step 103, the RS determines whether there is any MS-CID requesting the allocation of bandwidth in MS-CIDs. The MS inserts CID information and necessary bandwidth allocation request information in an MS-CID message transmitted to the RS. So, if a specific type is set in an MAC signaling header for bandwidth requesting CID, the RS can distinguish CID requiring bandwidth allocation by checking it.

If there is no bandwidth allocation request among MS-CIDs in the step 103, the RS sets both an LSB bit and an e-PBR bit in a type field of a generic MAC header to "0" and then creates a message free of bandwidth allocation in step 105.

Meanwhile, if there need to be a bandwidth allocation request in the step 103, the RS determines whether to use an extended sub-header in step 107. If a message will be made based on the extended sub-header, the RS sets the ESF field to "1" in step 109 and then determines whether bandwidth requesting MS-CID or RS-CID mapped to MS-CID is more than one in step 111.

If bandwidth requesting CID is a single in the step 111, the RS performs a single piggyback by setting the extended sub-header type to A or B in step 113.

When performing a single piggyback in the step 113, the RS uses the order of CIDs set to RS-CID as identifiers of RS-CID. In case where bandwidth allocation request information about RS-CID is recorded adjoining the identifier of RS-CID, the RS may set the extended sub-header type to "A". Alternatively, in case where CID information corresponding to bandwidth requesting RS-CID is recorded in a sub-header and also related bandwidth allocation request information is recorded in a conventional grant management sub-header added to the above sub-header, the RS sets the extended sub-header type to "B".

Meanwhile, if bandwidth requesting CID is more than one in the step 111, the RS sets the extended sub-header type to one of C, D and E, and performs a multiple piggyback in step 115.

The extended sub-header type C is set in case where the RS requests bandwidth allocation based on a multiple piggyback scheme using both an extended sub-header and order information of an RS-CID list. The extended sub-header type D is set in case where the RS requests bandwidth allocation through a multiple piggyback scheme using both the extended sub-header and a bitmap created from respective RS-CIDs corresponding to an RS-CID list. The extended sub-header type E is set in case where the RS requests bandwidth allocation based on a multiple piggyback scheme using both an extended sub-header and other sub-headers for recording CID information corresponding to each of several RS-CIDs.

On the other hand, if no extended sub-header is used in the step 107, the RS determines whether bandwidth requesting CID is more than one in step 117.

If bandwidth requesting CID is more than one in the step 117, the RS sets the LSB bit and the e-PBR bit of the generic MAC header to "0" and "1", respectively, in step 119, and then performs a multiple piggyback based on a grant management sub-header in step 121.

A multiple piggyback scheme based on the grant management sub-header includes a type of using an RS-CID list, a type of using a bitmap, and a type of using several conventional grant management sub-headers.

A multiple piggyback scheme using the RS-CID list is to extract the order of bandwidth requesting RS-CIDs from the RS-CID list of arranged RS-CIDs corresponding to respective MS-CIDs and then to write together this order information and bandwidth allocation request information of CID. Here, the RS writes information about the total number of bandwidth requesting CIDs, and bandwidth allocation information for each CID may be recorded using the conventional grant management sub-header.

A multiple piggyback scheme using the bitmap is to make a map of bit values by assigning bandwidth requesting RS-CIDs to "1" and non-bandwidth requesting RS-CIDs to "0" in an RS-CID list and then to distinguish bandwidth requesting CIDs through such bit values. In proportion to the number of CIDs assigned "1", the RS adds conventional grant management sub-headers that record bandwidth allocation request information about such CIDs assigned "1" in the bitmap.

A multiple piggyback scheme using the several conventional grant management sub-headers is to extract CIDs from respective bandwidth requesting RS-CIDs, to add sub-headers for recording such CIDs, to arrange a conventional grant management sub-header for recording bandwidth allocation request information about each CID to adjoin each sub-header, and thereby to make a message.

If bandwidth requesting CID is a single in the step 117, the RS determines whether CID contained in a generic MAC header requests the allocation of bandwidth in step 123.

If CID contained in the generic MAC header is bandwidth requesting CID in the step 123, the RS sets the LSB bit and the e-PBR bit of the generic MAC header to "1" and "0", respectively, in step 125, and then performs a piggyback for CID contained in the generic MAC header in step 127.

Meanwhile, if bandwidth requesting CID is not CID contained in the generic MAC header but other CID in the step 123, the RS sets both the LSB bit and the e-PBR bit of the generic MAC header to "1" in step 129, and then performs a single piggyback based on a grant management sub-header in step 131.

Here, a single piggyback scheme based on the grant management sub-header includes a single piggyback scheme based on an RS-CID list and a single piggyback scheme using a conventional grant management sub-header.

A single piggyback scheme based on the RS-CID list is to use, as an RS-CID identifier, an index value corresponding to the order of bandwidth requesting RS-CIDs in the RS-CID list, and then to write together this RS-CID identifier and bandwidth allocation request information of the RS-CID identifier. This message adds 2-byte sub-header.

A single piggyback scheme using the conventional grant management sub-header is to assign 2-byte sub-header for CID information of bandwidth requesting RS-CID, and to record bandwidth allocation request information corresponding to CID information in the 2-byte sized conventional grant management sub-header added to the above sub-header.

As discussed heretofore, the method for requesting the allocation of bandwidth according to embodiments of this invention may support various schemes, depending on the number of bandwidth requesting CIDs, the use or not of an extended sub-header, and the use or not of a grant management sub-header. Additionally, in each scheme, by allowing an integrated management of a conventional process of having to transmit a 6-byte generic MAC header for each CID in order to request bandwidth allocation, the method of this invention may reduce the size of a message, also reduce the number of message transmission and reception, and thereby decrease the network load.

Figure 17:
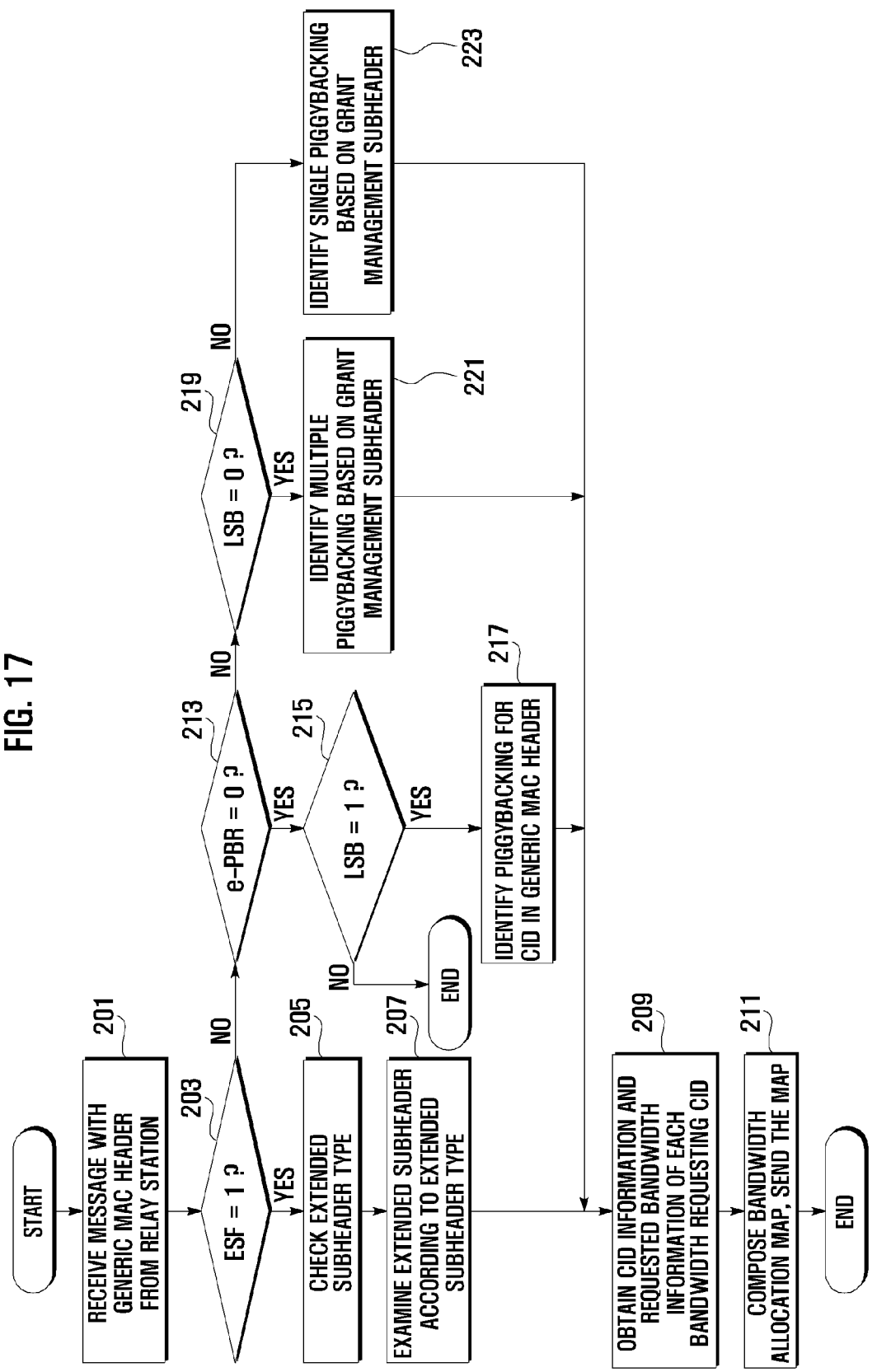
FIG. 17 is a flow diagram illustrating a method for allocating bandwidth at a base station in accordance with an exemplary embodiment of the present invention.

FIG. 17 is a flow diagram illustrating a method for allocating bandwidth at a base station in accordance with an exemplary embodiment of the present invention.

Referring to FIG. 17, in step 201, the BS receives a generic MAC header from the RS. Then, in step 203, the BS determines whether the extended sub-header field ESF of the generic MAC header is "1".

If the ESF is "1" in the step 203, the BS ascertains that the received generic MAC header has the extended sub-header in step 205. Then, in step 207, the BS checks a grant management sub-header depending on the extended sub-header type. Namely, in the step 207, the BS ascertains the type A, B, C, D or E of the extended sub-header added to the received generic MAC header and then checks each sub-header differently defined according to the type.

Then, in step 209, the BS obtains information about bandwidth requesting CID and bandwidth allocation request information. Based thereon, in step 211, the BS makes a bandwidth allocation map and sends it to the RS.

Meanwhile, if the ESF region is not "1" in the step 203, the BS determines whether the e-PBR region is "0" in step 213.

If the e-PBR region is "0" in the step 213, the BS further determines whether the LSB bit of the type field is "1" in step 215. If the LSB bit is not "1" in the step 215, the BS terminates a process without any allocation of bandwidth. If the LSB bit is "1" in the step 215, the BS ascertains that the received message is a piggyback for CID contained in the generic MAC header in step 217, and then performs the aforesaid steps 209 and 211.

On the other hand, if the e-PBR region is not "0" in the step 213, the BS further determines whether the LSB bit is "0" in step 219. If the LSB bit is "0" in the step 219, the BS ascertains that the received message is a multiple piggyback based on a grant management sub-header in step 221. Then the BS performs the aforesaid steps 209 and 211. Here, in case where the received message is a multiple piggyback based on a grant management sub-header, the BS may find bandwidth requesting CIDs and bandwidth allocation request information by checking sub-headers added to the generic MAC header.

If the LSB bit is not "0" in the step 219, the BS ascertains that the received message is a single piggyback based on a grant management sub-header in step 223, and then performs the aforesaid steps 209 and 211.

While this invention has been particularly shown and described with reference to an exemplary embodiment thereof, it will be understood by those skilled in the art that various changes in form and details may be made therein without departing from the spirit and scope of the invention as defined by the appended claims.

The invention claimed is:

1. A method for requesting an allocation of bandwidth for at least one mobile station (MS) in a multi-hop relay environment, the method comprising:
   identifying, at a relay station (RS), connection identifications (CIDs) of the at least one MS belonging to the RS;
   receiving, at the RS, a first message including a first CID for identifying a first service and a second message including a second CID for identifying a second service from the at least one MS, the first message and the second message including information requesting bandwidth allocation;
   detecting, at the RS, the second CID that requires the allocation of bandwidth among the identified CIDs using the received second message;
   generating, at the RS, information corresponding to CID-related information of the second CID and bandwidth request information of the second CID, if the second CID is detected;
   generating, at the RS, a media access control (MAC) header including information corresponding to the first CID; and
   adding, at the RS, the generated information to the MAC header,
   wherein the generated information comprises a total number of bandwidth requesting CIDs,
   wherein an extended piggyback request bit (e-PBR) included in the MAC header is set to 0 if the second CID is not detected, and
   wherein the e-PBR bit included in the MAC header is set to 1 if the second CID is detected.

2. The method of claim 1, wherein, if in the detecting only the second CID is detected, the generating of the information further comprises recording an order of the second CID arranged in a list of the CIDs as the CID-related information.

3. The method of claim 1, wherein, if in the detecting only the second CID is detected, the generating of the information further comprises recording the second CID as the CID-related information.

4. The method of claim 1, wherein, if in the detecting more than the second CID is detected, the generating of the information further comprises:
   generating a first information by recording the total number of the bandwidth requesting CIDs in the CID-related information and by recording bandwidth request information corresponding to the first CID included in the MAC header; and
   generating a second information for the second CID by recording an order of the second CID, excluding the first CID included in the MAC header, arranged in a list of the identified CIDs as the CID-related information and by recording the bandwidth request information of the second CID in the CID-related information.

5. The method of claim 1, wherein, if in the detecting more than the second CID is detected, the generating of the information further comprises:
   generating bitmap information for distinguishing the second CID from non-bandwidth requesting CIDs in a list of the identified CIDs and recording the bitmap information as the CID-related information; and
   recording the bandwidth request information of the second CID.

6. The method of claim 1, wherein, if in the detecting more than the second CID is detected, the generating of the information further comprises:
   generating a first information by recording the total number of the bandwidth requesting CIDs as the CID-related information and also by recording bandwidth request information for the first CID included in the MAC header; and
   generating a second information for the second CID by recording the CID corresponding to the second CID and by recording the bandwidth request information of the second CID.

7. The method of claim 1, wherein, if in the detecting only the second CID is detected and an extended sub-header is used in the detecting of the second CID, the generating of the information further comprises:
   recording an extended sub-header group length field and an extended sub-header type field; and
   recording an extended sub-header body field containing the CID-related information and the bandwidth request information according to the type of the extended sub-header type field.

8. The method of claim 7, wherein, if the extended sub-header type is a first value, the generating of the information further comprises:
   generating the extended sub-header body field by recording the order of the second CID arranged in a list of the identified CIDs in the CID-related information and by recording the bandwidth request information of the second CID.

9. The method of claim 7, wherein, if the extended sub-header type is a second value, the generating of the information further comprises:
   generating the extended sub-header body field by recording the second CID as the CID-related information and by recording the bandwidth request information of the second CID.

10. The method of claim 7, wherein, if the extended sub-header type is a third value, the generating of the information further comprises:
    generating a first information by recording the total number of the bandwidth requesting CIDs in the CID-related information and by recording bandwidth request information corresponding to the CID contained in the MAC header; and
    generating a second information for the second CID by recording the order of the second CID, excluding the first CID included in the MAC header, arranged in a list of the identified CIDs as the CID-related information and by recording the bandwidth request information of the second CID in the CID-related information.

11. The method of claim 7, wherein, if the extended sub-header type is a fourth value, the generating of the information further comprising:
    generating bitmap information for distinguishing the second CID from non-bandwidth requesting CIDs in a list of the identified CIDs and recording the bitmap information as the CID-related information; and
    recording the bandwidth request information of the second CID.

12. The method of claim 7, wherein, if the extended sub-header type is a fifth value, the generating of the information further comprises:
    generating a first information by recording the total number of the bandwidth requesting CIDs as the CID-related information and also by recording bandwidth request information for the first CID included in the MAC header; and generating a second information for the second CID by recording the CID corresponding to the second CID and by recording the bandwidth request information of the second CID.

13. A relay station (RS) for requesting an allocation of bandwidth for at least one mobile station (MS) in a multi-hop relay environment, the RS comprising:
a transceiver configured to transmit and receive a signal;
a
controller configured to:
identify connection identifications (CIDs) of the at least one MS, receive a
first message including a first CID for identifying a first service and a second message including a second CID for identifying a second service from the at least one MS, the first message and the second message including information requesting bandwidth allocation,
detect the second CID that requires the allocation of bandwidth among the CIDs using the received second message,
generate information corresponding to CID-related information of the second CID and bandwidth request information of second CID,
generate a media access control (MAC) header including information corresponding to the first CID, and
add the generated information to the MAC header,
wherein the generated information comprises a total number of the bandwidth requesting CIDs,
wherein an extended piggyback request bit (e-PBR) included in the MAC header is set to 0 if the second CID is not detected, and
wherein the e-PBR bit included in the MAC header is set to 1 if the second CID is detected.

14. The RS of claim 13, wherein the controller is further configured to record, if in the detecting only the second CID is detected, an order of the second CID arranged in a list of the CIDs as the CID-related information.

15. The RS of claim 13, wherein the controller is further configured to record, if in the detecting only the second CID is detected, the second CID as the CID-related information.

16. The RS of claim 13, wherein the controller is further configured to:
generate, if in the detecting more than the second CID is detected, a first information by recording the total number of the second CID in the CID-related information and by recording bandwidth request information corresponding to the first CID included in the MAC header, and
generate a second information for the second CID by recording the order of the second CID, excluding the first CID included in the MAC header, arranged in a list of the identified CIDs as the CID-related information and by recording the bandwidth request information of the second CID in the CID-related information.

17. The RS of claim 13, wherein the controller is further configured to:
generate, if in the detecting more than the second CID is detected, bitmap information for distinguishing the second CID from non-bandwidth requesting CIDs in a list of the identified CIDs,
record the bitmap information as the CID-related information, and record the bandwidth request information of the second CID.

18. The RS of claim 13, wherein the controller is further configured to:
generate, if in the detecting more than the second CID is detected, a first information by recording the total number of the second CID as the CID-related information and also by recording bandwidth request information for the first CID included in the MAC header, and
generate a second information for the second CID by recording the CID corresponding to the second CID and by recording the bandwidth request information of the second CID.

19. The RS of claim 13, wherein the controller is further configured to:
record, if in the detecting only the second CID is detected and an extended sub-header is used, an extended sub-header group length field and an extended sub-header type field, and
record an extended sub-header body field containing the CID-related information and the bandwidth request information according to the type of the extended sub-header type field.

20. The RS of claim 19, wherein the controller is further configured to generate, if the extended sub-header type is a first value, the extended sub-header body field by recording the order of the second CID arranged in a list of the identified CIDs in the CID-related information and by recording the bandwidth request information of the second CID.

21. The RS of claim 19, wherein the controller is further configured to generate, if the extended sub-header type is a second value, the extended sub-header body field by recording the second CID as the CID-related information and by recording the bandwidth request information of the second CID.

22. The RS of claim 19, wherein the controller is further configured to:
generate, if the extended sub-header type is a third value, a first information by recording the total number of the bandwidth requesting CIDs in the CID-related information and by recording bandwidth request information corresponding to the CID contained in the MAC header, and
generate a second information for the second CID by recording the order of the second CID, excluding the first CID included in the MAC header, arranged in a list of the identified CIDs as the CID-related information and by recording the bandwidth request information of the second CID in the CID-related information.

23. The RS of claim 19, wherein the controller is further configured to:
generate, if the extended sub-header type is a fourth value, bitmap information for distinguishing the second CID from non-bandwidth requesting CIDs in a list of the identified CIDs and recording the bitmap information as the CID-related information, and
record the bandwidth request information of the second CID.

24. The RS of claim 19, wherein the controller is further configured to:
generate, if the extended sub-header type is a fifth value, a first information by recording the total number of the bandwidth requesting CIDs as the CID-related information and by recording bandwidth request information for the first CID included in the MAC header, and generate a second information for the second CID by recording the CID corresponding to the second CID and by recording the bandwidth request information of the second CID.

\* \* \* \* \*